United States Patent
Hook et al.

(10) Patent No.: US 11,211,080 B2
(45) Date of Patent: Dec. 28, 2021

(54) CONVERSATION DEPENDENT VOLUME CONTROL

(71) Applicant: Peiker Acustic GmbH, Friedrichsdorf (DE)

(72) Inventors: Brandon Hook, Grand Blanc, MI (US); Daniel Soberal, Rochester Hills, MI (US)

(73) Assignee: PEIKER ACUSTIC GMBH

( * ) Notice: Subject to any disclaimer, the term of this patent is extended or adjusted under 35 U.S.C. 154(b) by 45 days.

(21) Appl. No.: 16/719,575

(22) Filed: Dec. 18, 2019

(65) Prior Publication Data

US 2021/0193162 A1 Jun. 24, 2021

(51) Int. Cl.
*G10L 21/0208* (2013.01)
*G10L 25/81* (2013.01)
*G10L 25/84* (2013.01)
*B60R 16/037* (2006.01)
*G10L 17/00* (2013.01)
*G10L 25/78* (2013.01)

(52) U.S. Cl.
CPC ...... *G10L 21/0208* (2013.01); *B60R 16/0373* (2013.01); *G10L 17/00* (2013.01); *G10L 25/81* (2013.01); *G10L 25/84* (2013.01); *G10L 2025/783* (2013.01)

(58) Field of Classification Search
CPC ..... G10L 21/0208; G10L 17/00; G10L 25/81; G10L 25/84; G10L 2025/783; B60R 16/0373
See application file for complete search history.

(56) References Cited

U.S. PATENT DOCUMENTS

| 9,799,330 B2* | 10/2017 | Nemala ................... G10L 25/06 |
| 2013/0166076 A1 | 6/2013 | Karr |
| 2016/0005421 A1 | 1/2016 | Gratzel et al. |

(Continued)

FOREIGN PATENT DOCUMENTS

| JP | 2009139894 | * | 6/2009 | ............. G10L 15/20 |
| WO | WO-2008075305 A1 | * | 6/2008 | ............. G10L 21/02 |

OTHER PUBLICATIONS

NPL-JP_2018077278_A_I-Sato-NotReliedOn (Year: 2018).*
NPL-JP_2009139894_A_I-Sanehiro-Translation (Year: 2009).*

*Primary Examiner* — Pierre Louis Desir
*Assistant Examiner* — Nicole A K Schmieder
(74) *Attorney, Agent, or Firm* — Weaver Austin Villeneuve & Sampson LLP

(57) ABSTRACT

Techniques are described for detecting a conversation between at least two people, and for reducing noise during the conversation. In certain embodiments, at least one speech metric is generated based on spectral analysis of an audio signal and is used to determine that the audio signal represents speech from a first person. Responsive to determining that the speech is part of a conversation between the first person and a second person an operating state of a device in a physical environment is adjusted such that a volume level of sound contributed by or associated with the device is reduced. The sound contributed by or associated with the device corresponds to noise, at least for the duration of the conversation. Therefore, reducing the volume level of sound contributed by or associated with the device reduces the overall noise level in the environment, resulting in a reduction in conversational effort.

18 Claims, 12 Drawing Sheets

(56) References Cited

U.S. PATENT DOCUMENTS

2016/0234595 A1 8/2016 Goran et al.
2018/0047417 A1* 2/2018 Gummadi .............. G08B 23/00
2019/0355352 A1* 11/2019 Kane .................. G06K 9/00832

* cited by examiner

CONVERSATION DEPENDENT VOLUME CONTROL

BACKGROUND

Aspects of the disclosure relate to automated control over a volume level of noise within a physical environment, by adjusting the operating state of one or more devices that contribute to sound in the environment and in response to detecting a conversation between two or more people. Sound contributing devices exist in different types of environments and can include devices that directly produce sound, such as a loudspeaker coupled to a radio receiver, a heating, ventilation, and air conditioning (HVAC) system in a vehicle, certain household appliances, or other electrical devices. Sound contributing devices can also include devices that do not directly produce sound, but which instead influence the amount of sound in the environment depending on the operating state of the sound contributing device. For example, an open window transmits more sound than a closed window. Thus, a sound contributing device can be a device that produces (e.g., directly emits or causes to be emitted) sound or a device that is associated with sound (e.g., through influencing the volume level of a sound from a source other than the sound contributing device).

When a sound source is undesirable, it is considered a noise source. Some sound sources are generally considered noise sources. For instance, the sounds produced by an HVAC system are undesirable byproducts of operating the HVAC system and, while being tolerable to a certain extent, may nevertheless detract from the sound quality of the environment. Thus, some sound sources are regarded as noise sources irrespective of whether there is a conversation occurring. Other sound sources are sometimes desirable, but sometimes undesirable. For instance, when someone wants to listen to the radio, the radio is not considered a noise source. However, when someone is trying to have a conversation and the radio is playing in the background, the sound from the radio may be distracting and, in some instances, interfere with the audibility of speech. Accordingly, it may be desirable to reduce the volume of noise sources when there is a conversation between two or more people.

In a vehicle environment (e.g., a motor vehicle), there are systems that have the ability to adjust the volume of an audio system based on the speed of the vehicle. This is based on the assumption that at higher speeds there is more road noise, and therefore the volume of the audio system should be increased to prevent road noise from overpowering the audio system. Such systems fail to take into consideration whether there is a conversation occurring and may also fail to detect noise by means of direct measurement, since the presence of noise is merely inferred from vehicle speed in many applications.

BRIEF SUMMARY

Methods, apparatuses, and computer-readable media are disclosed for detecting a conversation in a physical environment and, in response to detecting the conversation, reducing noise in the environment by controlling one or more sound contributing devices to reduce the volume level of sound contributed by those devices. Also disclosed herein are various techniques for detecting speech activity and, based on the results of the speech detection, determining whether the speech is associated with a conversation between a first person (a talker) who is the source of the speech and a second person who is a listener, and possibly a second source of speech. In some embodiments, speech or conversation detection takes into consideration information about noise in the environment including, for example, noise generated or influenced by a sound contributing device.

In certain embodiments, a physical environment is divided into a plurality of talker and listener zones and the acoustic activity (speech, noise, loudspeaker playback, etc.) from each of the zones is captured via acoustic transducers and analyzed to determine whether there is a conversation between a talker in one zone and a listener in another zone. The microphone and/or loudspeaker signals (audio) to and/or from a particular zone may be subjected to signal processing that enables better speech or conversation detection through, for example, performing echo cancelation to filter out the audio signals which arrive at the microphone from the loudspeakers, prior to performing speech detection on the filtered audio.

In certain embodiments, a conversation is detected based on determining that there is one person speaking and at least one person listening. In some embodiments, conversations are detected based on determining that there are multiple talkers who are speaking at different times. Various spectral analysis techniques for detecting speech and conversation are described herein. Spectral analysis may involve analyzing the frequency components of an audio signal and how the frequency components vary over time. In general, human speech is distinguishable from other sounds based on pitch, harmonics and rhythm.

In certain embodiments, a conversation is detected based on determining that there is a person speaking and further based on detection of the Lombard effect on that person's speech. The Lombard effect is the involuntary tendency of a talker to increase their speaking effort in the presence of noise and in an attempt to make their voice more audible. The increase in speaking effort can include not only increasing speaking volume, but also changes in pitch, duration, and other speech characteristics.

In certain embodiments, speech or conversation detection involves applying one or more speech models to distinguish speech from noise. A speech model is, in some embodiments, derived through a machine learning process involving training the speech model on a plurality of speech samples and noise samples. In embodiments where the Lombard effect is detected, a speech model may apply knowledge of the expected level of Lombard effect for a particular level of noise.

In certain embodiments, a method for reducing noise in a physical environment involves receiving, by a control system, a first audio signal corresponding to sound captured by a first microphone located in the physical environment; and generating, by a processing unit of the control system and based on spectral analysis of the first audio signal, at least one speech metric. The spectral analysis comprises analysis of changes in frequency components of the first audio signal over a period of time. The at least one speech metric comprises a value indicative of whether the first audio signal represents human speech. The method further involves determining, by the control system and based on the at least one speech metric, that the first audio signal represents speech from a first person; and determining, by the control system, that the speech is part of a conversation between the first person and a second person. The second person is a person who participates in the conversation as at least a listener and is located in the physical environment or located remotely. The method further involves adjusting, by the control system and in response to the determining that the speech is part of the conversation between the first person and the second person, an operating state of a device in the physical environment such that a volume level of sound contributed by or associated with the device is reduced. The sound contributed by or associated with the device corresponds to the noise and/or unwanted/distracting sound in the environment, so reducing the volume level of this sound results in a reduction in conversational effort.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Certain embodiments are described in connection with a vehicle environment. However, the embodiments can be applied to other types of physical environments including, for example, indoor environments comprising one or more rooms. Thus, the embodiments can be implemented on a smart speaker or home automation system, a conference system in an office, or other control systems or devices capable of adjusting the operating state of a sound contributing device.

As indicated earlier, it may be desirable to reduce the volume of noise sources when there is a conversation between two or more people. Thus, in certain embodiments, a sound contributing device is controlled such that the noise volume in a physical environment is reduced as a result. In a vehicle environment, noise sources can include, for example, road noise, engine noise, HVAC (heating, ventilation, and air conditioning) noise, a radio broadcast, and noise from external traffic. Examples of noise sources in a home environment include noise from a dishwasher, water running from a faucet, a fan in a microwave or range hood, a television set, a home theater system, a furnace or air conditioner, etc.

A conversation involves speech communicated from a talker to a listener. The speech is communicated using language and generally comprises patterns of vowels and consonants corresponding to words. In a typical conversation between two people, the participants generally take turns speaking and listening to each other. During the conversation, there may be brief periods of time in which both people are speaking simultaneously, or brief periods of time in which neither person is speaking after previously speaking. Accordingly, certain aspects of the present disclosure relate to techniques for, as part of detecting a conversation, determining how many people are involved in the conversation and the timing of their speech in relation to each other.

In certain embodiments, volume adjustments are avoided based on determining that a talker is speaking to himself or herself. Thus, the scenario of speaking to oneself may not be treated as a conversation for purposes of adjusting the volume level in the environment. This is because there is less concern about audibility when there is no listener present or when the speech is not directed to a listener. Other types of voice activity, such as singing, can also be detected and eliminated from consideration when deciding whether to adjust the volume level.

Figure 1:
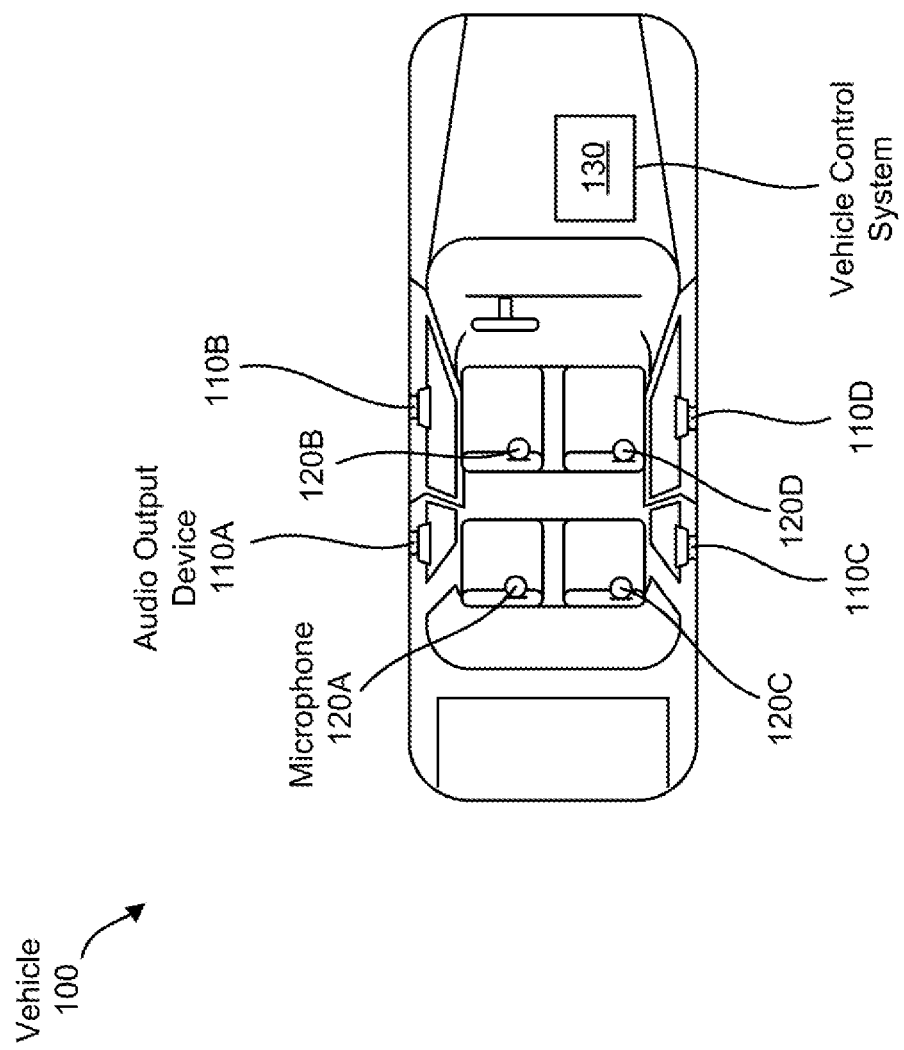
FIG. 1 illustrates a vehicle environment in which one or more embodiments of the present disclosure can be implemented.

To determine how many people are speaking and where the talkers are located within the environment, certain embodiments may employ a plurality of audio input devices for capturing sound from different locations throughout the environment, as shown in FIG. 1.

FIG. 1 illustrates a vehicle environment in which one or more embodiments of the present disclosure can be implemented. The vehicle environment includes a vehicle 100 equipped with a plurality of microphones 120A-D and a plurality of audio output devices (e.g., loudspeakers) 110A-D. As shown in FIG. 1, the vehicle 100 includes four seats, with a microphone 120 within a vicinity of each of the seats. In one example, each microphone 120 may be placed optimally (with respect to location and orientation) to pick up a voice of an occupant of the vehicle. Each microphone may capture sound around the location of the microphone. The microphones 120A-D can be omnidirectional or directional, and may be integrated into the headliner, overhead console, A-pillar, seat belts, B-pillars (for rear occupants), or other suitable locations where the microphones can capture sounds from vehicle occupants. The placement of a microphone may be such that sounds originating from the seat nearest the microphone are loudest, while sounds originating from other locations in the vehicle (e.g., one of the other three seats) are captured to a lesser extent. Thus, in the embodiment of FIG. 1, the interior of the vehicle 100 is divided into four zones, each zone being associated with a potential occupant in the vehicle.

The vehicle 100 further includes a vehicle control system 130. Although shown as a single block, the vehicle control system 130 can include multiple components distributed throughout the vehicle. The vehicle control system 130 may be configured to control, among other things, the operation of one or more sound contributing devices in the vehicle. As indicated above, sound contributing devices can include devices that directly produce sound and devices that influence the amount of sound in the environment without producing any significant amount of sound by themselves. Devices that do not produce sound may nevertheless influence the volume level of noise (e.g., sound generated by some other source) based on the operating state of such devices. In a vehicle environment such as that depicted in FIG. 1, sound contributing devices may include, for example, the windows in each of the doors, the vehicle's HVAC system, the audio output devices 110A-D (which can be part of a loudspeaker playback system with a volume control apparatus), a privacy divider separating the driver/front passenger cabin from the rear passenger cabin, and the like. An example of a vehicle control system is shown in FIG. 2.

FIG. 1 is merely an example of a physical environment in which embodiments of the present disclosure can be implemented. Further, the number and placement of microphones and audio output devices may vary, e.g., depending on the layout of the environment. For instance, in an office setting, the environment could be a conference room with microphones placed around a table (e.g., one microphone per seat or every other seat). In a home setting, the environment could include several adjoining rooms with one or more microphones in each room. Thus, the number of zones, the size of a zone, and the number of people associated with each zone can vary.

Figure 2:
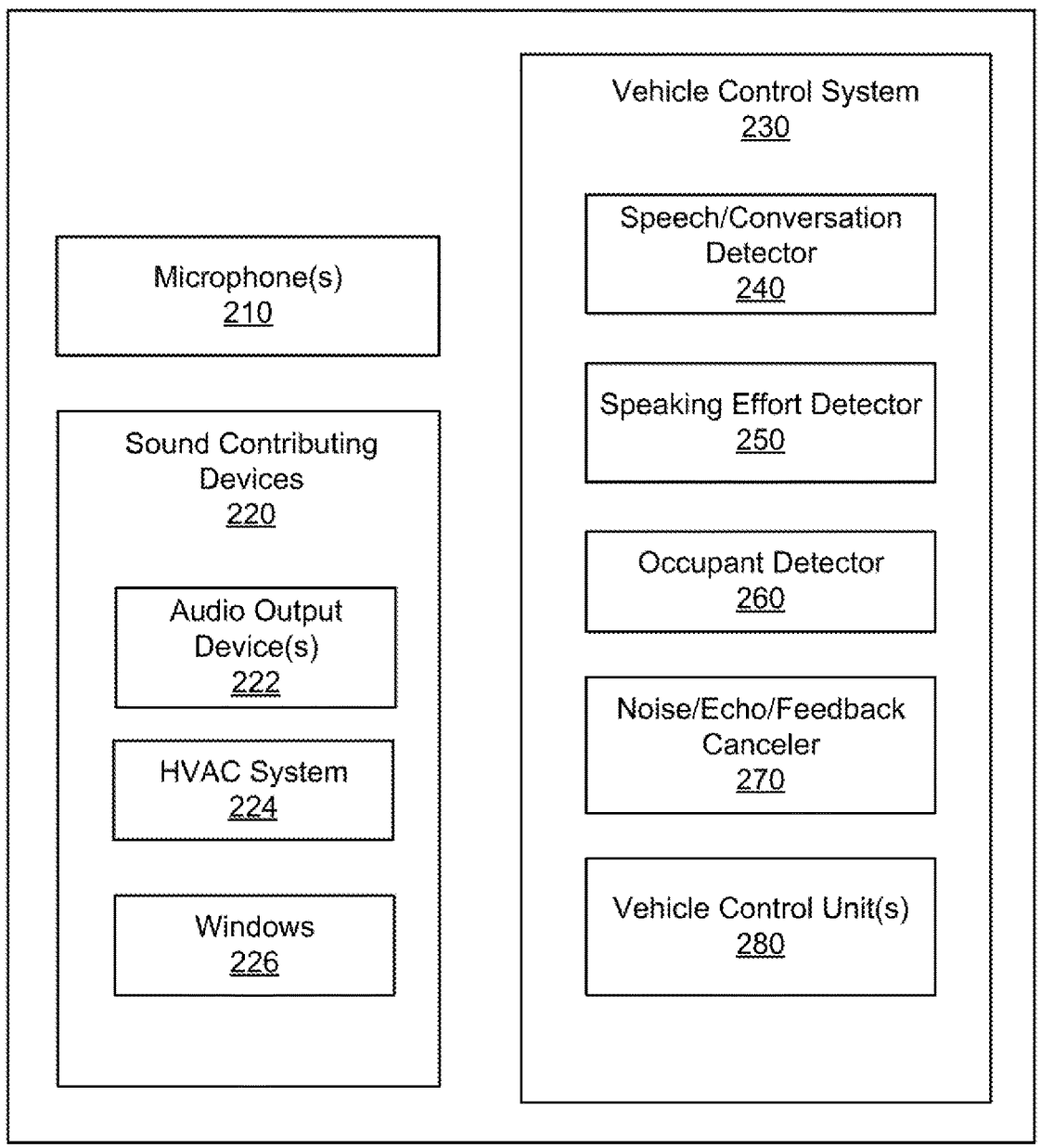
FIG. 2 is a simplified block diagram of vehicle components that can be used to implement one or more embodiments.

FIG. 2 is a simplified block diagram of vehicle components 200 that can be used to implement one or more embodiments. Vehicle components 200 include components that are located within a vehicle, such as one or more microphones 210 and sound contributing devices 220 (e.g., one or more audio output devices 222, an HVAC system 224, and windows 226). The vehicle components 200 further include a vehicle control system 230 which, as depicted in FIG. 2, includes one or more vehicle control units 280. In certain embodiments, one or more components of the vehicle control system 230 are remotely located from the vehicle and/or configured to communicate with a remote system in connection with volume control. FIG. 1 is merely an example of components that may be involved in volume control in a vehicle environment. One of ordinary skill in the art would recognize many possible variations, alternatives, and modifications. For example, in some implementations, vehicle control system 230 may combine two or more components, or may have a different configuration or arrangement of components.

Microphones 210 may correspond to the microphones 120A-D in FIG. 1 and are configured to capture sound from at least one zone in the vehicle. Each microphone 210 may comprise a transducer that converts acoustic sound into an electrical audio signal. As mentioned above, microphones can be of various types. For example, a microphone 210 may be a directional microphone with a polar pattern that enables the microphone to capture more sound in the direction in which the microphone is pointed, e.g., a uni-directional microphone with a cardioid pattern or a bi-directional microphone with a figure-8 pattern. In embodiments with multiple microphones 210, each microphone 210 may be placed in a suitable location that, in combination with the polar pattern of the microphone, enables the microphone to capture substantially more sound from a particular zone associated with the location of the microphone. That is, the power of a signal representing sound originating from the zone of the microphone would be much higher (e.g., 10 to 20 decibels higher) compared to the power of a signal produced by sound originating from a different zone.

Audio output devices 222 may include loudspeakers located throughout the vehicle. The audio output devices 222 may be operable to play audio content such as radio broadcasts, audio captured by the microphones 210 (e.g., as part of an in-vehicle public announcement system or other in-car communication system), audio transmitted from a mobile device via Bluetooth or some other wireless communication protocol (e.g., during a phone call), instructions from an on-board navigation system, and the like. Although FIG. 1 depicts each zone as having an audio output device, the number and placement of the audio output devices 222 can vary. For example, some zones may only have a microphone and no audio output device.

HVAC system 224 may comprise electrical and mechanical components that generate noise, the volume level of which varies depending on the operating state of the HVAC system. For example, HVAC system 224 may include an air conditioning compressor unit, a dashboard fan, and one or more motor operated fans, each of which has different settings that determine the level of noise produced by the HVAC system.

Windows 226 may comprise electric windows with a range of opening positions that influence the amount of noise within the interior of the vehicle depending on which windows are open and to what extent. Although the windows 226 themselves do not create noise, the speed of the vehicle and the presence of external noise sources (e.g., neighboring vehicles and road noise), together with the state of the windows 226, contributes to the level of noise experienced by vehicle occupants. In general, fully closing all of the windows creates the maximum amount of noise isolation. However, there are situations where opening a window can reduce the noise level. For instance, depending on the speed of the vehicle and the shape of the cabin, partially opening a single window can create wind buffeting due to Helmholtz resonance—noise which can be reduced by, for example, opening a second window. Opening a window can also reduce noise when noise is primarily coming from inside the vehicle, for example, when a person who is not part of a conversation is yelling or singing loudly.

Vehicle control system 230 can implement the vehicle control system 130 in FIG. 1 and includes, in addition to the vehicle control units 280, a speech or conversation detector 240, a speaking effort detector 250, an occupant detector 260, and a noise/echo/feedback canceler 270. Each of the blocks within vehicle control system 230 can be implemented in software, hardware, or a combination of hardware and software. Further, blocks can be combined or separated without loss of functionality. For example speech/conversation detector 240 can be implemented as a standalone speech detector and a conversation detector coupled to an output of the speech detector.

Speech/conversation detector 240 is configured to detect speech based on analysis of audio signals produced by the microphones 210. The analysis of the audio signals may involve spectral analysis of frequency components of the audio signals. Speech/conversation detector 240 is further configured to detect a conversation based on the audio signals. In some implementations, speech detection is performed prior to conversation detection. Upon determining that there is an audio signal representing speech, the speech/conversation detector further analyzes the audio signal to determine whether the speech is part of a conversation. For example, the speech/conversation detector may be configured to perform parallel speech detection on audio signals from multiple microphones and to determine whether there is a conversation involving speech in one audio signal and speech in another audio signal. Additionally, conversation detection may optionally employ information about the physical state of people in the environment, e.g., occupants in the vehicle. Such information can be provided, for example, by the occupant detector 260.

In certain embodiments, speech/conversation detector 240 generates a Boolean result represented, for example, as a binary signal indicating whether speech is present at a particular point in time and/or a binary signal indicating whether a conversation is present at a particular point in time. Additionally, as will be explained below, speech detection may involve analyzing one or more types of speech metrics derived from an audio signal in order to make a determination as to whether speech is present.

Speaking effort detector 250 is configured to determine whether a talker is exerting a greater than expected speaking effort. The talker may be a person whose sounds/utterances have been determined by the speech/conversation detector 240 as corresponding to speech. Speaking effort detector 250 may determine whether the talker is exerting a greater than expected effort relative to his/her previous spectral content and magnitude for a given noise level. Alternatively or additionally, speaking effort detector 250 may make the determination relative to a noise level in the environment. For example, it can be expected that a person would raise the loudness or pitch of their voice in proportion to the noise level. Accordingly, speaking effort detector 250 may be configured to determine the extent to which the talker has shifted their voice beyond the level expected for the amount of noise currently present in the environment. Thus, speaking effort detector 250 could also employ a relative threshold. For example, to determine whether the talker is exerting a greater effort than expected, the speaking effort detector 250 may be configured with, or may access stored information about, expected speaking effort levels for different levels of ambient noise. The expected speaking effort levels can be expressed, for example, in terms of features derived from spectral analysis, such as frequencies and spectral magnitude.

The speaking effort detector 250 may generate, as a speaking effort metric, a Boolean result indicating whether a person is exerting greater than expected effort. Speaking effort detector 250 could also generate a speaking effort metric that quantifies the extent of the exerted effort. The speaking effort metric(s) can be used as a basis for determining, by the speech/conversation detector 240, whether there is a conversation. For instance, speech/conversation detector 240 may be configured to determine that there is a conversation whenever a person is exerting greater than expected speaking effort for a certain amount of time, e.g., greater than expected effort for at least fifty percent of the time during a time window of ten seconds. In some implementations, greater than expected speaking effort may in itself be a sufficient condition for concluding that there is a conversation. In other implementations, greater than expected speaking effort may not be treated as dispositive, but may instead be combined with other conversation indicators (e.g., an output of the occupant detector 260) to determine whether there is a conversation.

Occupant detector 260 is configured to obtain information about people in the environment. This information could simply indicate whether or not there is a person in a particular location. For example, occupant detector 260 may include a strain-based sensor that detects the presence of a person in a particular seat based on the weight of the person. The presence of multiple occupants in the vehicle can be a basis for ruling out the possibility that a person is having a conversation with himself or herself. Occupant detector 260 may also employ one or more sensors by which additional information about a person in the environment, e.g., the person's posture or gaze direction, is determined. For example, occupant detector 260 may include a ceiling mounted radar system that generates a map of the vehicle cabin based on radar signals. The location and boundaries of an occupant in three-dimensional space can be determined from such a map. Alternatively or additionally, occupant detector 260 may include one or more cameras that capture images of occupants. Such additional information can be used to determine whether a first person is paying attention to a second person. For example, the combination of the second person talking plus the first person leaning toward, facing, or looking at the first person is highly indicative that the first person is trying to listen to the second person's speech. Additionally, more confidence in conversation detection may come from behavioral cues (for example, leaning in) occurring together with Lombard detection in one or more talker zones. Also, the cadence of when someone leans in is important and is, in certain embodiments, taken into consideration when detecting conversation. For example, if another occupant leans in after speech occurs in the driver's zone, and after Lombard effect is observed in driver's zone, then it is clear that the occupant's lean indicates a desire to be part of a conversation involving the driver. Also a lean-in indicates that the leaning occupant is experiencing a higher than normal listening effort, and therefore efforts should be taken to reduce noise contributions where possible.

Noise/echo/feedback canceler 270 is configured to reduce the contribution of one or more noise sources to an audio signal captured by a microphone 210. In some implementations, the noise/echo/feedback canceler 270 performs cross-talk cancelation between audio signals captured from different microphones. As indicated above, a microphone can be designed and/or positioned in such a way that sounds originating from a location associated with the microphone are captured to a greater extent than sounds from other locations. Cross-talk cancelation can be employed to further reduce sound from other locations, for example, speech from a neighboring occupant. To perform cross-talk cancelation, noise/echo/feedback canceler 270 can determine whether an audio signal from a first location is represented in an audio signal from a second location (e.g., based on statistical correlation). If so, noise/echo/feedback canceler 270 can subtract a portion of the contribution of the audio signal from the first location. This subtraction of noise (competing talker in this case) can be performed to provide an audio signal for input to the speech/conversation detector 240 that better represents the sound originating from a location of interest (e.g., the second location).

Figure 6:
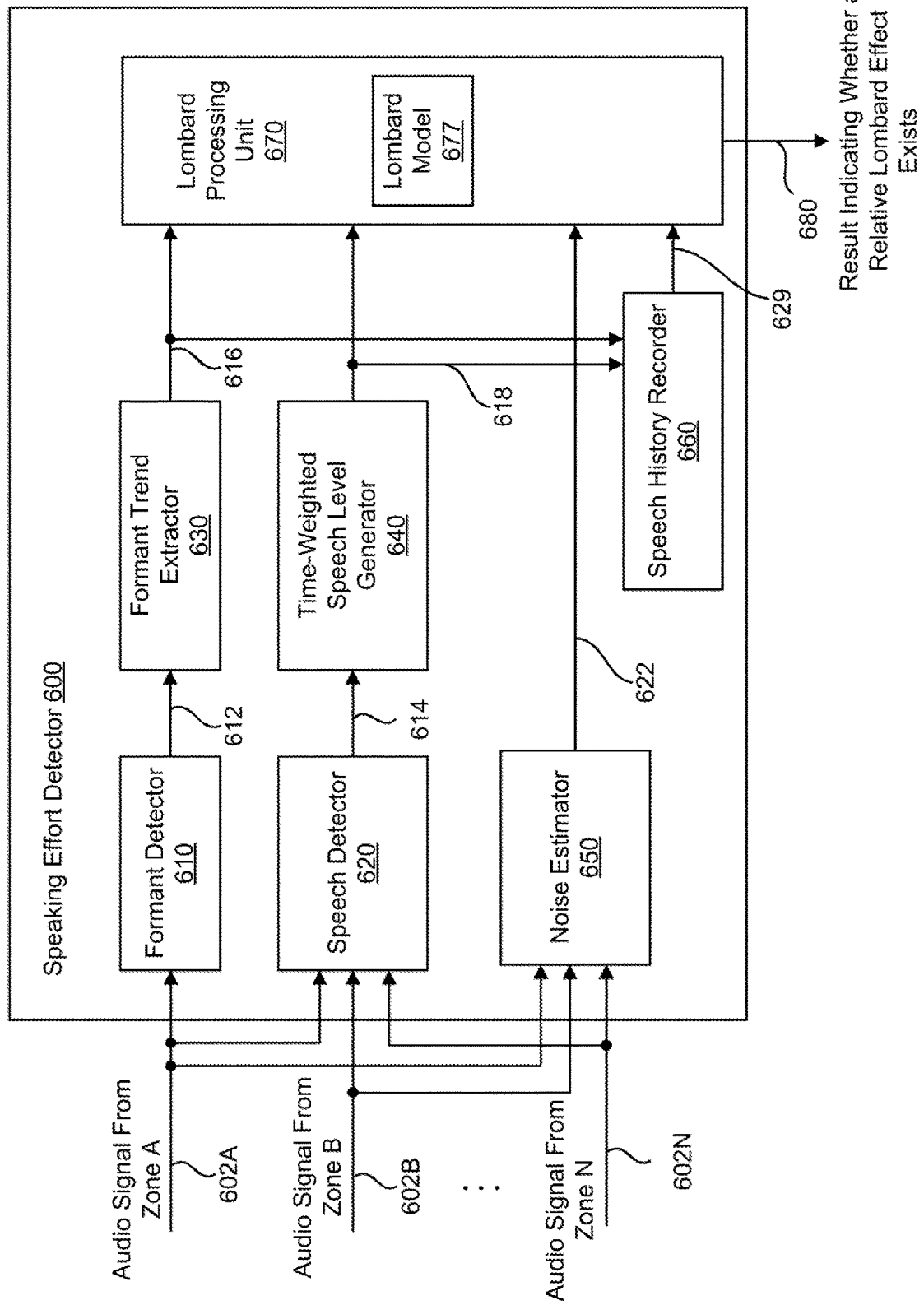
FIG. 6 is a simplified block diagram of a speaking effort detector according to certain embodiments.

Speaking effort detector 250 may perform spectral analysis to determine speaking effort. The spectral analysis used to determine speaking effort may differ from that performed for speech detection in that the focus is on identifying speaking effort indicators instead of speech in general. For example, in certain embodiments, the speaking effort detector 250 uses the Lombard effect as a speaking effort indicator. As discussed earlier, the Lombard effect is the involuntary tendency of talkers to increase their speaking effort in the presence of noise and in an attempt to make their voice more audible. The Lombard effect is detectable based on changes over time in certain spectral characteristics of an audio signal corresponding to a person's voice. An example of a speaking effort detector implementing Lombard effect detection is shown in FIG. 6.

In some embodiments, the noise/echo/feedback canceler 270 can perform feedback cancelation, echo cancelation, and/or noise cancelation to clean a contaminated microphone audio signal such that only speech from the microphone's zone remains in the audio signal. Feedback is common for in-car communication systems. Echo is common for bidirectional, full-duplex communication systems. In some embodiments, noise is defined as all remaining signals which are not speech, feedback or echo, and which do not originate in the microphone's zone. Feedback cancelation differs from cross-talk cancelation in that the noise source to be removed is the actual captured audio signal from the location of interest, which has been amplified for output through the audio output device, and then captured by the same microphone that produced the audio signal, in addition to all other microphones from other zones (in a standard car cabin situation). This is common for in-car communication systems. A feedback loop comprising the microphone, the audio output device, and an amplifier undergoes positive feedback that often produces a loud, high-pitched squeal. To reduce the occurrence of such feedback and to provide a cleaner audio signal for input to speech/conversation detector 240, earlier samples of the audio signal can be subtracted from later samples of the audio signal, similar to the subtraction of audio signals from other locations during cross-talk cancelation, as discussed above. Feedback and echo cancellation can be performed by an adaptive filter which continuously tries to identify the impulse response of the room or cabin (e.g., through updating a running estimate of the impulse response), using the loudspeaker and microphone transfer functions. Once this impulse response has been identified, for all loudspeaker to microphone combinations/paths, the microphone's received portion of the loudspeaker signals can be removed (e.g., 20-30 dB can be removed with a linear echo canceller). The transfer function may change very quickly if anything in the room or cabin changes, for example, if one of the occupants slightly moves his/her arms or legs. Therefore, the adaptive filter constantly updates/adapts its parameters to changes in the environment. Adaptive filters (including echo cancellers) are well-known in the art of speech signal processing.

Vehicle control units 280 may include one or more hardware and/or software based controllers that control various aspects of vehicle operation. For example, the vehicle control units 280 may include one or more electronic control units (ECUs) that control the engine, a transmission, power steering, a powertrain, acceleration, and/or braking. In certain embodiments, vehicle control units 280 include at least one control unit configured to control a sound contributing device such that the volume of noise in the environment is reduced in response to a change in operating state of the sound contributing device. For example, a vehicle control unit 280 may roll up the windows 226, lower the volume of a radio station or audio file being played through one or more of the audio output devices 222, reduce a fan speed or raise/lower a target temperature of the HVAC system, and so on.

The vehicle control unit 280 can implement logic for determining which sound contributing device to adjust and to what extent. The logic may take into consideration what noise sources are currently present and which sound contributing devices are capable of reducing the volume of such noise sources. In some implementations, vehicle control unit 280 may make incremental adjustments. For example, vehicle control unit 280 could turn down the volume of the radio slightly, wait to see if there is a reduction in noise and/or a reduction in speaking effort, and then turn the volume of the radio down even further if there is not enough of an improvement (e.g., until a target speaking effort level is reached).

The vehicle control unit 280 is, in certain embodiments, configured to identify the extent to which noise may be reduced (e.g., decibel addition/reduction). Since vehicle control unit 280 has access to the sound processing components, and knowledge of the states of systems, devices, or components that contribute to or influence noise, such as windows, HVAC, radio and the like, the vehicle control unit 280 would know the ambient noise level (e.g., through generating a noise estimate) before and after actuation of said systems, devices, or components. Therefore, the vehicle control unit 280 would know how much noise could be reduced as a result of actuating each individual system, device, or component to change its operating state, and could then choose to actuate a system/device/component that provides a greater noise reduction. For instance, the vehicle control unit 280 could compare the noise reduction levels that would be achievable through individually changing the operating states of two or more devices and select the device that provides the greatest amount of noise reduction. A noise estimate of each system/device/component could be stored and the estimate updated periodically based on the actual difference in noise measured before and after activation/actuation.

Incremental adjustments may involve adjusting different sound contributing devices in a particular order. The order in which adjustments to different sound contributing devices are performed could be based on the amount of noise contribution of each of the sound contributing devices. Typically, devices that contribute more noise are adjusted before adjusting devices that contribute less noise. The adjustment order may also take into consideration or prioritize occupant comfort. For example, audio output devices 222 may be adjusted before adjusting the HVAC system 224 when the HVAC system 224 has been set below a certain temperature, since cooling may be a bigger contributor to comfort than audibility of radio in such instances.

In addition to reducing the volume of noise contributed by a sound contributing device, the vehicle control unit 280 may also control a sound contributing device to increase the level of sound contributed by the device in response to determining that a conversation has ended. An increase in volume may be performed because the sound contributed by the device, while considered as being noise in relation to the conversation, may not be considered as noise outside of the conversation. As with the volume reduction discussed above, adjustments for increasing volume can be made gradually or incrementally so as not to startle or annoy people in the vehicle.

Additionally, in certain embodiments, the control system may implement a distraction framework to identify distraction sources that draw a person's attention away from a conversation. Distraction sources are not limited to acoustic noise sources, but can relate to any of the senses, for example, visual distractions, unusual or unpleasant smells, sudden changes in temperature, and the like. Accordingly, the vehicle control system 230 may be configured to not only control volume, but also to control, via the same or a different control unit 280 and through adjusting the operating state of one or more devices, the extent of other types of conversation distractors.

Although FIG. 1 shows microphones 120A-D as being located inside the vehicle, conversation dependent volume control is not necessarily limited to conversations between people in the same physical environment. For instance, the speech/conversation detector 240 may be configured to determine that there is a conversation between a first person inside the vehicle and a second person remotely located from the vehicle. Such a conversation could be detected, for example, based on the voice of the second person being captured by a microphone after being output through a loudspeaker in the vehicle, or based on receiving/intercepting signals transmitted between a mobile device (e.g., a smartphone) operated by the first person and a communications system (e.g., a Bluetooth audio system) in the vehicle.

Additionally, the adjustment actions taken by the vehicle control unit 280 may, in some implementations, take into consideration user preferences. For example, the driver of the vehicle may have previously indicated a preference for which sound contributing devices 220 to adjust (e.g., audio output devices and windows only), the order in which to adjust (e.g., windows first), and the extent to which a particular sound contributing device should be adjusted (e.g., lower the volume of audio output devices to a certain level, but never fully mute the audio output devices). Such user preferences could be stored in a user profile, e.g., within a local memory of the vehicle or on a remote computer server.

The vehicle control unit 280 may adjust the operating state of the sound contributing device in response to determining, based on an output of the speech/conversation detector, that there is a conversation between at least one talker and at least one listener. In some implementations, the vehicle control unit that adjusts the operating state of the sound contributing device may be integrated into the speech/conversation detector 240. Further, separate control units can be provided for controlling different sound contributing devices.

Figure 3:
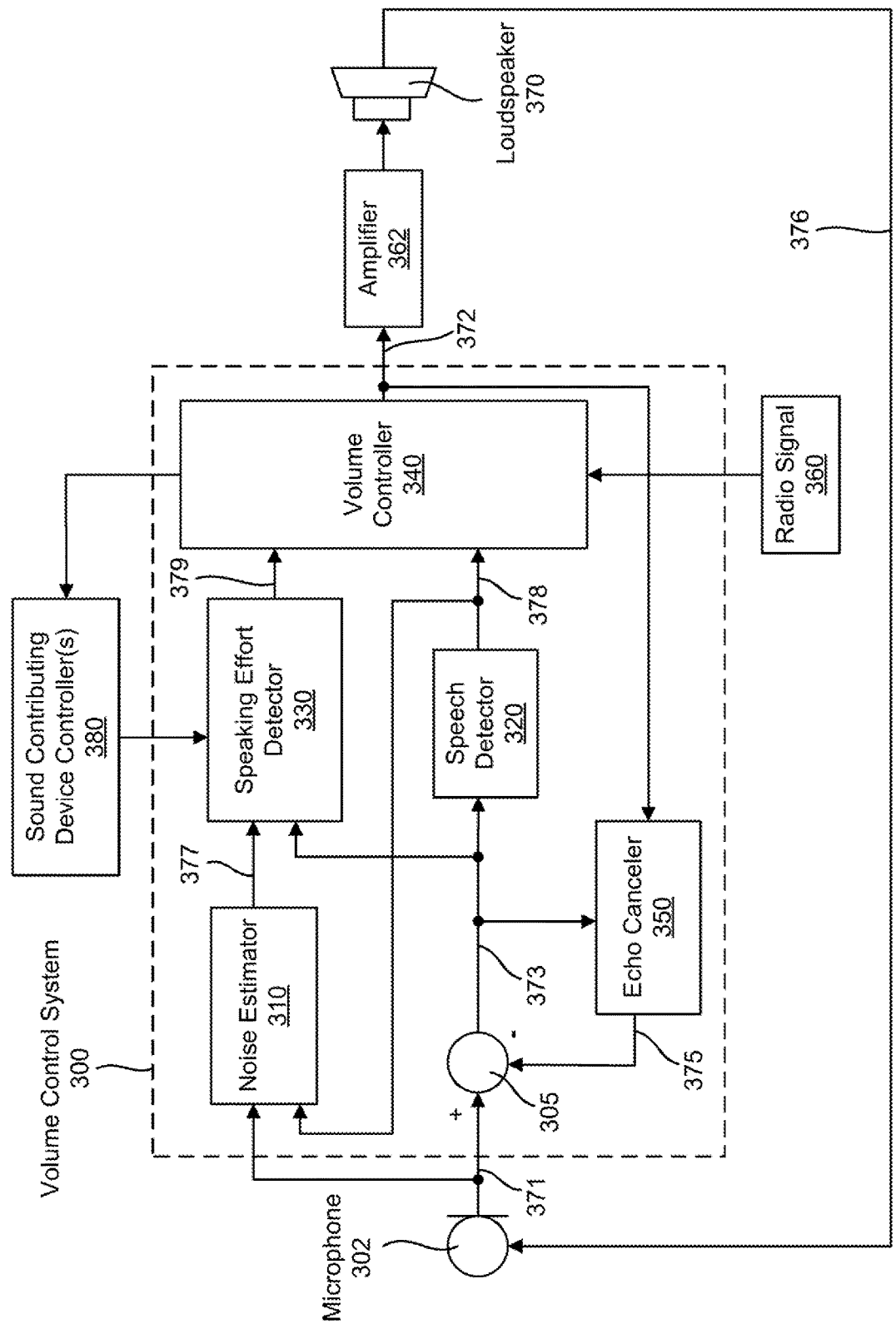
FIG. 3 is a simplified block diagram of a volume control system according to certain embodiments.

FIG. 3 is a simplified block diagram of a volume control system 300 according to certain embodiments. The volume control system 300 includes a noise estimator 310, a speech detector 320, a speaking effort detector 330, a volume controller 340, and an echo canceler 350. As depicted in FIG. 3, the volume control system 300 receives an audio signal 371 from a microphone 302 (e.g., one of the microphones 120A-D in FIG. 1) and outputs an audio signal 372 to an amplifier 362 that is in turn coupled to a loudspeaker 370. In the embodiment of FIG. 3, the audio signal 372 corresponds to a radio signal 360.

Echo canceler 350 receives an audio signal 372 corresponding to the output from volume controller 340 being sent to the loudspeaker 370, and further receives an audio signal 373 derived from the audio signal 371 captured by the microphone 302. The echo canceler 350 adapts an impulse response to model an electro-acoustic transfer function. The transfer function modeled by the echo canceler 350 represents a combination of the transfer functions of the amplifier 362, loudspeaker 370, microphone 302, and a room acoustic path 376 leading from the loudspeaker 370 to the microphone 302. The echo canceler 350 outputs a signal 375, which is a convolution of the audio signal 372 and the estimated impulse response of the electro-acoustic path (through 362, 370, 376, and 302). Signal 375 is sent to a subtraction block 305, where it is subtracted from the audio signal 371 captured by the microphone 302 to update the signal 373. The resultant signal 373 has therefore filtered the portion of audio signal 372 which coupled onto the microphone 302 from the loudspeaker 370 and via the room acoustic path 376. For instance, microphone 302 may be in sufficient proximity to the loudspeaker 370 that the radio signal 360 played over the loudspeaker 370 is captured along with the voice of a person in the same zone as the microphone 302.

Noise estimator 310 generates a spectrum estimate 377 based on the audio signal 371 from the microphone 302. The noise estimator 310 is triggered by an output signal 378 of the speech detector 320. The output signal 378 can be a signal indicative of whether or not there is speech present in the audio signal 373. The noise estimator 310 updates the spectrum estimate 377 when the signal 378 indicates there is no speech, so that the spectrum estimate 377 is representative of the amount of noise present in the audio signal 371. The spectrum estimate 377 is therefore a noise spectrum estimate and can be generated by identifying spectral characteristics associated with noise, for example, a repetitive low-frequency component in the audio signal 371. In this manner, the noise estimator 310 can use the audio signal 371 to determine the noise level and spectrum that is currently present in the environment.

Speaking effort detector 330 corresponds to the speech/conversation detector 240 in FIG. 2 which, as explained earlier, can detect speech based on spectral analysis of an audio signal (e.g., audio signal 373). As depicted in FIG. 3, the speaking effort detector 330 is coupled to one or more sound contributing device controllers 380. In particular, the device controllers 380 may provide the speaking effort detector 330 with information regarding the present operating state of one or more sound contributing devices, for instance, the current speed of an HVAC fan, which windows are open and by how much, the current volume setting of a loudspeaker, and so on. The operating states of the sound contributing devices are set by the device controllers 380, e.g., based on input from the volume controller 340.

Volume controller 340 can, as mentioned above, generate input for controlling one or more sound contributing devices through the device controllers 380. However, in some embodiments, volume controller 340 can be combined with the device controllers 380 in a single controller. Volume controller 340 is a vehicle control unit that encompasses the conversation detection portion of the speech/conversation detector 240 in FIG. 2. That is, in the embodiment of FIG. 3, speech detection and conversation detection are handled by separate units. Thus, the volume controller 340 receives the output signal 378 generated by the speech detector 320 and determines, based on the output signal 378 and an output 379 of the speaking effort detector 330, whether the audio signal 373 represents part of a conversation.

Although FIG. 3 shows only a single microphone 302, the volume control system 300 may include a similar arrangement of components for each microphone in the physical environment. Various components depicted in FIG. 3 may be shared between the microphones. For instance, a single volume controller 340 may receive output from speech detectors 320 and speaking effort detectors 330 associated with different microphones to enable the volume controller 340 to determine that an audio signal generated by a first microphone and an audio signal generated by a second microphone represent speech from two people having a conversation with each other. As another example, the noise estimator 310 may be configured to receive audio signals generated by a plurality of microphones and to estimate the noise level in the environment based on the audio signals, e.g., based on the same noise being simultaneously present at roughly the same volume in all of the audio signals.

Figure 4:
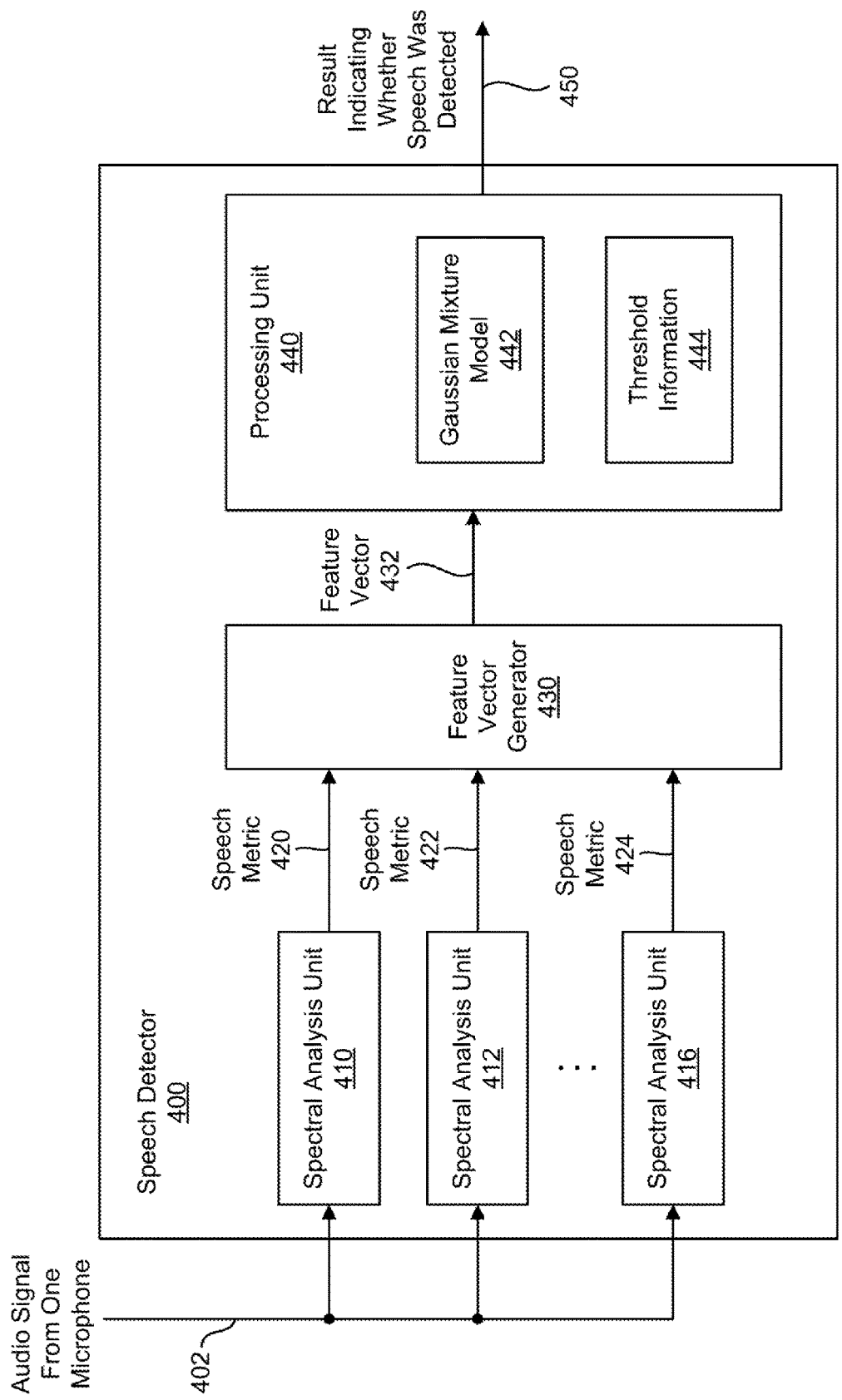
FIG. 4 is a simplified block diagram of a speech detector according to certain embodiments.

FIG. 4 is a simplified block diagram of a speech detector 400 according to certain embodiments. The speech detector 400 can implement the speech detector 320 in FIG. 3. Speech detector 400 includes a plurality of spectral analysis units 410, 412, and 416, a feature vector generator 430, and a processing unit 440. Although FIG. 4 shows three spectral analysis units, the total number of spectral analysis units can vary. Each spectral analysis unit receives an audio signal 402 as input and performs spectral analysis to generate a speech metric. The audio signal 402 is a signal generated by a microphone located in a particular zone. FIG. 4 depicts processing of a single audio signal. However, audio signals from other microphones can be processed in the same manner, e.g., using additional instances of the speech detector 400.

The spectral analysis units may be configured to generate different types of speech metrics from the same audio signal 402. For example, spectral analysis unit 410 may be configured to generate a speech metric 420 indicative of a long term spectral flatness (LTSF) of the audio signal 402. Spectral analysis unit 412 may be configured to generate a speech metric 422 indicative of a long term spectral variability (LTSV) of the audio signal 402. Spectral analysis unit 416 may be configured to generate one or more mel-frequency cepstrum coefficients (MFCCs) as a speech metric 424.

LTSF represents the flatness of the amplitudes of the frequency components of a time-varying signal, e.g., the audio signal 402. The frequency components can be determined by applying a Fourier transform (e.g., a Fast Fourier Transform) to the audio signal to determine the amplitudes of frequency components in a range of frequency bins spanning the power spectrum of the audio signal. The Fourier transform can be performed on samples of the audio signal taken over a particular time period (e.g., several seconds), where each sample corresponds to a sub-period (e.g., a three-millisecond frame). In certain embodiments, the spectral analysis unit 410 calculates the LTSF for a particular frame l as a function of power spectral density and based on the following equation:

$$LTSF(l) = \frac{1}{K} \sum_{k=0}^{K-1} \log \left( \frac{\left( \prod_{r=0}^{R-1} P_{xx}(k, l-r) \right)^{1/R}}{\frac{1}{R} \sum_{r=0}^{R-1} P_{xx}(k, l-r)} \right) \quad (1)$$

where $P_{xx}$ (k, l−r) is the power spectral density at frequency bin k and frame (l−r). The numerator of the parenthetical term in Equation 1 is the geometric mean of the power spectral density over R frames. The denominator is the average (arithmetic mean) of the power spectral density over R frames. Thus, Equation 1 represents the ratio of the geometric and arithmetic means over a series of R frames, and averaged over K frequency bins (e.g., the entire set of bins representing the power spectrum of audio signal 402). Because the arithmetic mean generally exceeds the geometric mean, the value of the LTSF metric is usually negative. Speech may be indicated when the LTSF exceeds a certain magnitude, e.g., when the absolute value of the LTSF is greater than some threshold, for instance, an absolute value of 1 or greater. In the absence of speech (e.g., when only noise is present), the LTSF can be expected to be relatively low-magnitude (e.g., between −0.5 and −0.6).

LTSV is a measure of statistical variability, and therefore indicates how much the frequency components of a time-varying signal are changing or remaining the same. For example, in the absence of speech, the frequencies of the audio signal 402 are expected to be relatively stationary. In certain embodiments, the spectral analysis unit 412 calculates the LTSV of the audio signal 402 based on a mean entropy over R frames and as follows:

$$\hat{H}(k, l) = \sum_{r=0}^{R-1} \frac{P_{xx}(k, l-r)}{\bar{P}_{xx}(k, l)} \log \left( \frac{P_{xx}(k, l-r)}{\bar{P}_{xx}(k, l)} \right) \quad (2)$$

where $\hat{H}$(k, l) is the mean entropy at frequency bin k and frame l, computed over R frames. As indicated in Equation 2, the mean entropy is a function of the power spectral density discussed above.

The spectral analysis unit 412 may calculate the LTSV as a function of the variance of the mean entropy:

$$LTSV(l) = \frac{1}{K} \sum_{k=0}^{K-1} \left| H(k, l) - \frac{1}{K} \sum_{m=0}^{K-1} H(m, l) \right|^2 \quad (3)$$

LTSV is expected to be around zero (e.g., 0.02 or lower) for stationary signals. When the signal becomes non-stationary (e.g., during speech), the LTSV will peak (e.g., 0.1 or higher).

The mel-frequency cepstrum (MFC) is a representation of the power spectrum of sound according the mel scale. MFCCs are a set of coefficients that form an MFC and are typically calculated by mapping the power spectrum onto the mel scale and applying a cosine transform to the logs of the powers at each of the mel frequencies to form the MFC, where the MFCCs represent the amplitudes of the MFC. The MFC therefore represents a transformation of the frequency response of a time-varying signal into a log-domain. The transformation makes the power spectrum more amenable to analysis by virtue of compressing the dynamic range of the time-varying signal and reducing amplitude differences between harmonic frequencies.

In some embodiments, a speech metric (e.g., the speech metric 422) may be generated through linear predictive coding (LPC). LPC is based on a source-filter model of human speech, where a speech signal corresponds to a signal from a sound source (e.g., the vocal cords in the throat) modified by an excitation signal representing resonances due to the activity of the vocal tract. The speech signal is a convolution of the signal from the sound source with the excitation signal. The excitation signal can include pulses created by the activity of the glottis. The resonances in the vocal tract give rise to spectral shapes known as formants, which correspond to peaks or local maxima in the power spectrum of the speech signal. LPC involves estimating a speech signal as a linear function of previous samples of the speech signal, where the estimated signal is represented as a weighted sum of the values of the previous samples, plus some value representing the contribution of the excitation signal. The weights are the LPC coefficients and characterize the formants. LPC can be applied to estimate the formants and isolate the excitation signal by removing the effects of the formants, thereby enabling the excitation signal to be further analyzed. LPC can also be used to synthesize speech by filtering a source signal using a filter made up of LPC coefficients.

Irrespective of whether the speech metric 422 is generated based on cepstral analysis or LPC, the speech metric 422 may represent the activity of one of the two components in the source-filter model of human speech. For instance, the speech metric 422 may correspond to MFCCs associated with glottal excitation, which are distinguishable from MFCCs associated with the activity of the vocal tract in that the coefficients associated with glottal excitation are generally much higher. Similarly, the speech metric 422 may correspond to LPC coefficients that represent formants resulting from the resonances in the vocal tract. In some embodiments, speech metrics representing both components in the source-filter model may be analyzed in connection with detecting speech.

As shown in FIG. 4, the speech metrics 420, 422, and 424 are input to the feature vector generator 430. Feature vector generator 430 is configured to generate a feature vector 432 by combining values of the speech metrics 420, 422, and 424. The above described speech metrics are merely a few examples of speech metrics that can be generated by the speech detector 400 for input to the feature vector generator 430. Another example of a speech metric that can be generated for input to the feature vector generator 430 is a signal-to-noise ratio (SNR) of the audio signal 402. The SNR may represent the spectral energy of the audio signal 402 over detected noise (e.g., a noise level estimated by the noise estimator 310 in FIG. 3).

Processing unit 440 is configured to apply a speech model to the feature vector 432 to determine whether the features contained in the feature vector 432 are indicative of speech activity. The speech model can be generated through training the speech model on training data comprising labeled speech data and labeled noise data (e.g., feature vectors derived from known speech signals and feature vectors derived from known noise signals). As shown in FIG. 4, the speech model can be implemented as a Gaussian mixture model (GMM) 442. Training of the GMM 442 may involve executing an expectation-maximization algorithm to determine a first probability distribution describing the likelihood of speech given a particular set of feature values and a second probability distribution describing the likelihood of noise given the same set of feature values. In this manner, the GMM 442 can be trained to classify newly observed data (e.g., audio signal 402 as represented by its feature vector 432) as speech or noise. Other types of statistical models may also be suitable besides GMMs for implementing the speech model. For instance, in some embodiments, the speech model may be generated using k-means clustering.

Processing unit 440 can, in addition to applying the GMM 442, apply threshold information 444 to reduce the occurrence of false positives. Threshold information 444 may comprise a threshold for a log-likelihood function of a distribution represented in the GMM 442. For instance, if the GMM 442 classifies the feature vector 432 as corresponding to speech and a threshold for the log-likelihood of the speech cluster is met, then the processing unit 440 may output a result 450 indicating that speech was detected. If the GMM 442 classifies the feature vector 432 as corresponding to noise or the threshold for the log-likelihood of the speech cluster is not met, then the result 450 may indicate that speech was not detected. Thus, the processing unit 440 can determine the probability that the feature vector 432 represents speech and/or the probability that the feature vector 432 represents noise. In some embodiments, the processing unit 440 may generate the result 450 based on which of the two probabilities is greater. For instance, if the probability of speech is greater than the probability of noise and the threshold for speech is met, then the result 450 may indicate that speech was detected. In general, statistics-based speech detection is usually unnecessary and speech can be conclusively detected without resorting to such measures. Accordingly, in certain embodiments, conventional speech detection techniques are used. However, statistics-KTS based speech detection can be helpful when the noise level is near or above the level of speech signals.

Figure 5:
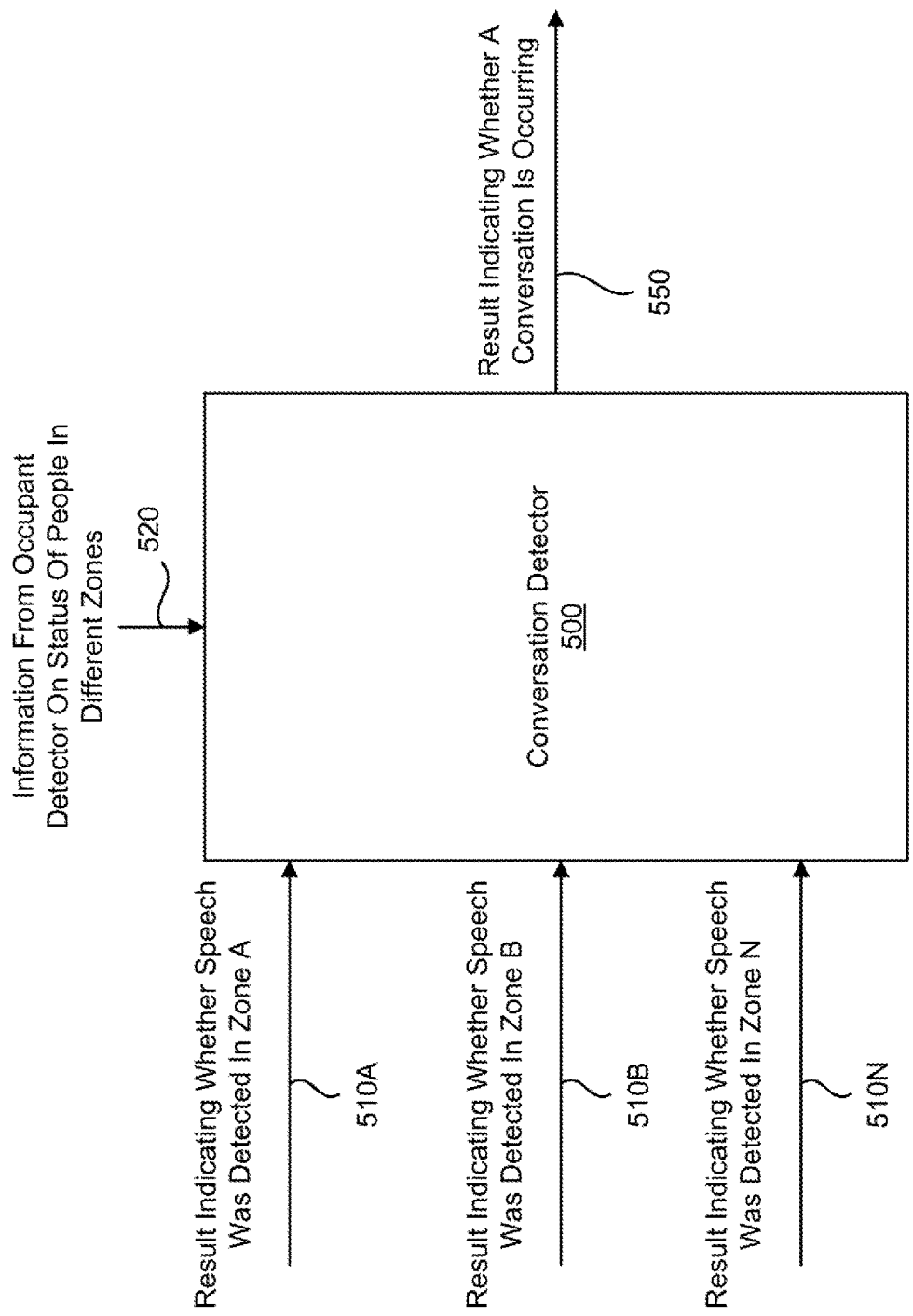
FIG. 5 is a simplified block diagram of a conversation detector according to certain embodiments.

FIG. 5 is a simplified block diagram of a conversation detector 500 according to certain embodiments. The conversation detector 500 is configured to generate a result 550 indicating whether a conversation is occurring, that is, whether a conversation is represented by one or more audio signals. In the embodiment of FIG. 5, the result 550 is generated based on the results of speech detection performed on audio signals from multiple zones in the physical environment. For example, as shown in FIG. 5, the conversation detector 500 receives a result 510A indicating whether speech was detected in a zone A, a result 510B indicating whether speech was detected in a zone B, and a result 510N indicating whether speech was detected in a zone N. The results 510A, 510B, and 510N could be results that were generated, for example, based on the processing described above in connection with the speech detector 400 in FIG. 4. The conversation detector 500 can generate the result 550 based on analysis of the relative timing of the results 510A, 510B and 510N. For instance, the result 550 could be generated according to the analysis depicted in FIGS. 7 and 8.

Figure 7:
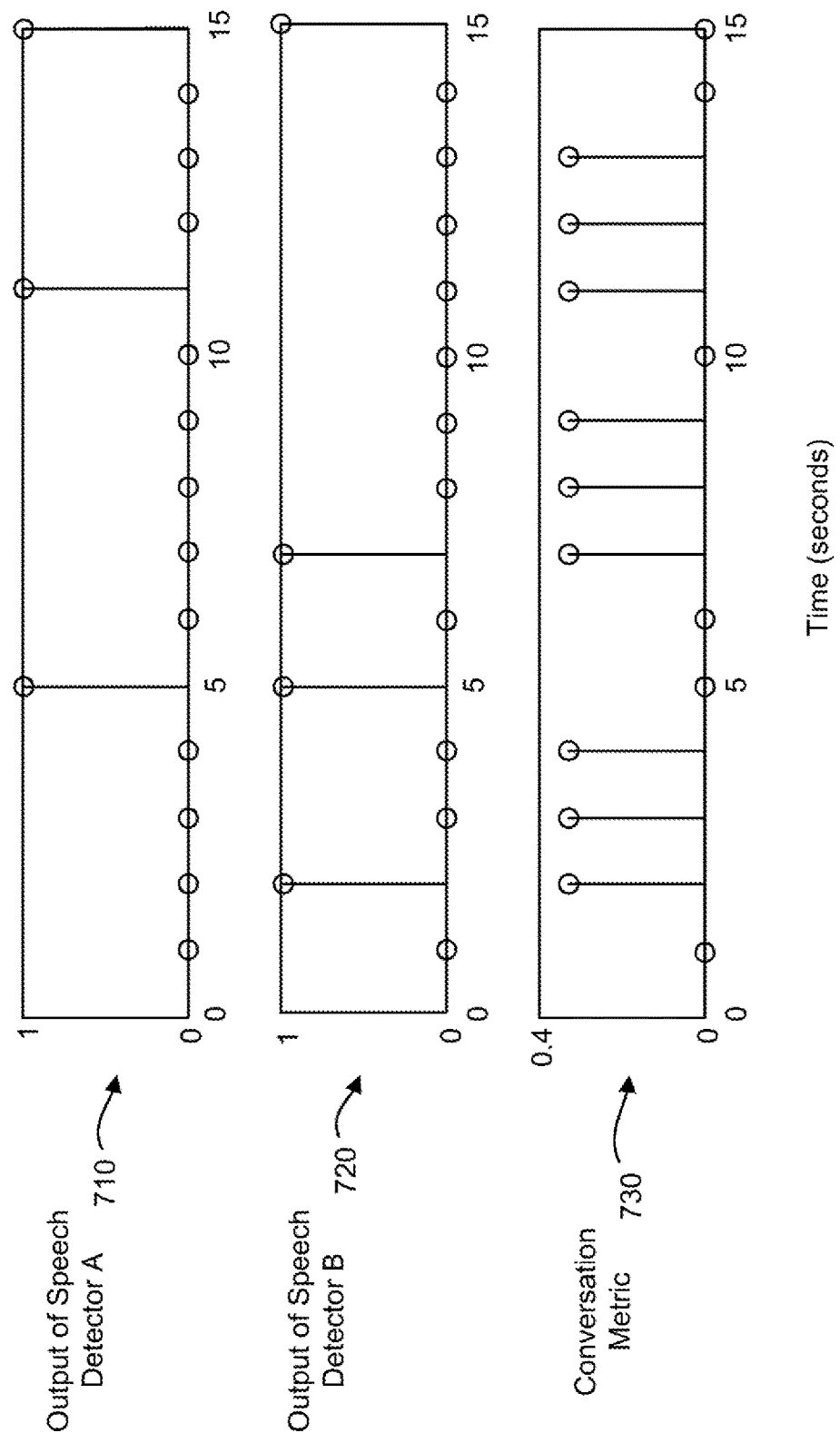
FIG. 7 includes a graph showing example behavior of a conversation metric in the absence of conversation.
Figure 8:
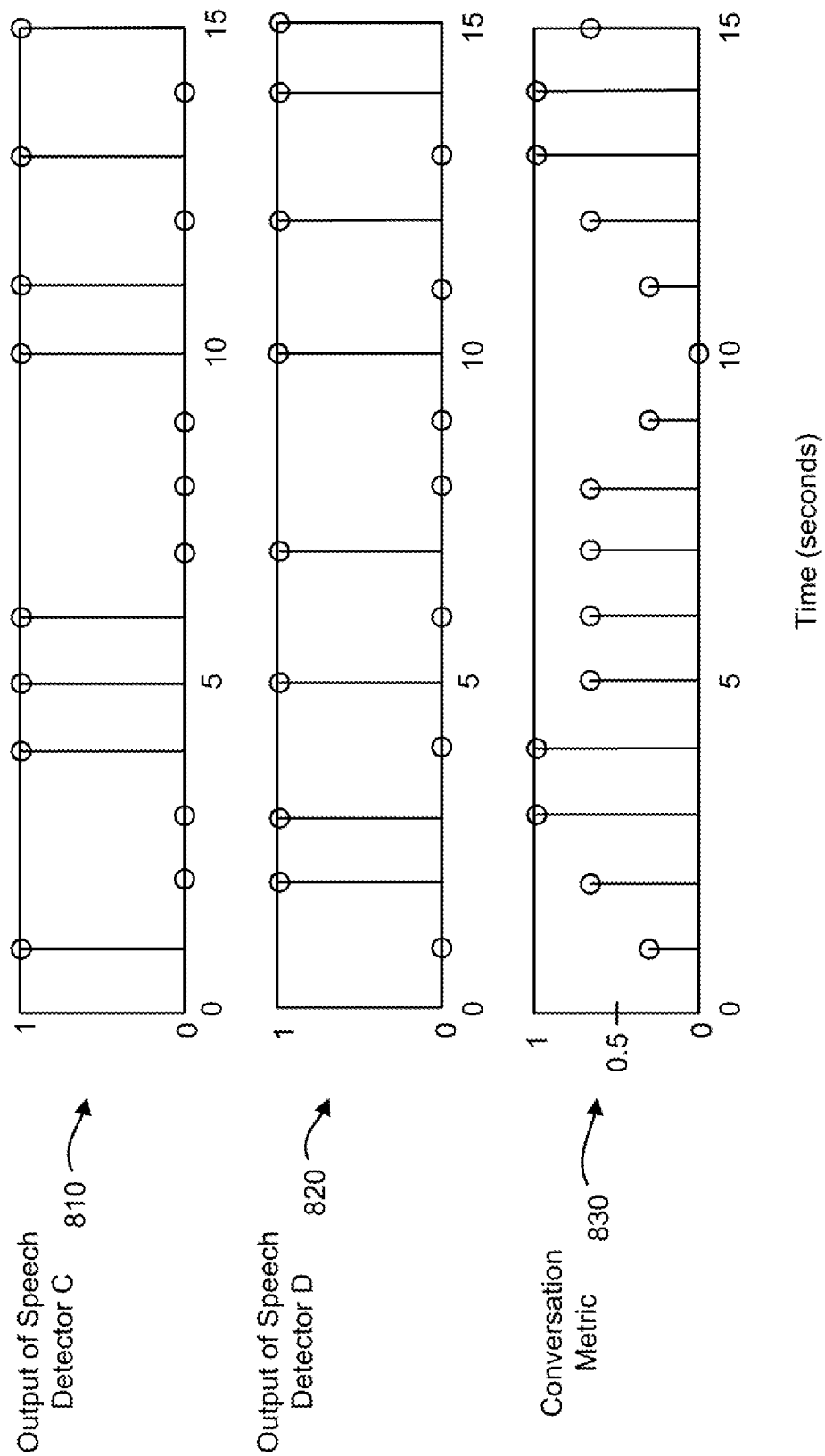
FIG. 8 includes a graph showing example behavior of a conversation metric in the presence of conversation.

FIG. 7 includes a graph showing example behavior of a conversation metric 730 in the absence of conversation. The conversation metric 730 is generated based on an output 710 of a first speech detector A and an output 720 of a second speech detector B. The outputs 710 and 720 may correspond to results 510 received as input to the conversation detector 500 in FIG. 5, and the conversation metric 730 may correspond to the result 550 generated by the conversation detector 500. The conversation metric 730 has a range of possible values, with a value of zero indicating no conversation detected and one or more values greater than zero indicating conversation detected. The values associated with conversation are not depicted in FIG. 7 since the conversation metric 730 never reaches these values. However, as shown in FIG. 8, there can be a range of conversation metric values associated with conversation, e.g., from 0.5 to 1, with higher values indicating a greater degree of certainty that there is a conversation. Thus, a conversation can be determined based on the conversation metric 730 exceeding a threshold associated with conversation.

As shown in FIG. 7, the speech detector A detects speech occurring at five, eleven, and fifteen seconds, and the speech detector B detects speech occurring at two, five, seven, and fifteen seconds. The conversation metric 730 can be generated by comparing the values of the outputs 710 and 720. For instance, conversation metric 730 may be calculated based on the absolute value of the difference between outputs 710 and 720. The difference may be calculated over several frames (e.g., as a sum of differences between the outputs 710 and 720 over a series of consecutive frames). Thus, each value of the conversation metric 730 can be calculated based on differences between the outputs 710 and 720 within a sliding window. However, in some embodiments, the difference can be calculated as an instantaneous difference between the outputs 710 and 720 at a specific point in time. Thus, the values of the conversation metric 730 may vary depending on whether only one person is speaking at a time.

There are times where one person is speaking (e.g., the person whose speech is detected by speech detector A) while the other person is not speaking (e.g., the person whose speech is detected by speech detector B). During such times, the difference between the outputs 710 and 720 is high. There are also times when neither person is speaking or both people are speaking simultaneously, in which cases the difference between the outputs 710 and 720 is low. During a typical conversation, two people take turns speaking, with relatively short periods of silence between switching talkers. In FIG. 7, the number of instances of switching between talkers is low. Further, the spacing between such switching is large, e.g., several seconds of silence after one person has finished speaking and the other person starts speaking. Therefore, the value of the conversation metric 730 is also low, indicating that there is no conversation.

FIG. 8 includes a graph showing example behavior of a conversation metric 830 in the presence of conversation. The conversation metric 830 can be generated in the same manner as conversation metric 730, but based on an output 810 of a first speech detector C and an output 820 of a second speech detector D. As shown in FIG. 8, the value of the conversation metric 830 starts to increase once speech has been detected and continues to increase in response to alternating speech activity from the other talker. At five seconds, the conversation metric 830 lowers as result of both people speaking simultaneously, indicating a lesser degree of certainty of conversation, but still within the range of values associated with conversation. A similar lowering of the conversation metric 830 occurs at ten seconds, this time to a value of zero, indicating that the conversation has likely ended. After ten seconds, the conversation metric 830 starts to increase again as the talkers resume speaking at alternate times.

Returning to FIG. 5, the conversation detector 500 may, in certain embodiments, generate the result 550 taking into consideration information 520 on the status of people in the various zones associated with the results 510A, 510B, and 510N. The information 520 is generated by an occupant detector (e.g., occupant detector 260 in FIG. 2) and may comprise information on whether there is a person in a particular zone, information on a direction in which the person is facing, information on whether the person is leaning towards another person, and so on.

The processing of audio signals from different zones is useful in certain conversation scenarios. However, multi-zone processing is dependent upon capturing speech from two or more people. Therefore, the case of a single person speaking would not be treated as being a conversation regardless of whether there are other people listening to the person speaking. Occupant detection is useful for identifying corner cases in which there is an interaction between two people that qualifies as a conversation even though only one person may be speaking. For instance, if there is only one talker and no one else present, then the talker is likely speaking to himself or herself, in which case there is no conversation that warrants a volume adjustment. However, if there is one talker and at least one other person listening to that talker, this may be treated as a conversation by the conversation detector 500 since volume adjustment could enhance the audibility of the talker for the benefit of the listener. Thus, occupant detection can supplement audio signal analysis so that the accuracy of conversation detection is improved compared to audio analysis alone.

FIG. 6 is a simplified block diagram of a speaking effort detector 600 according to certain embodiments. The speaking effort detector 600 may implement the speaking effort detector 250 in FIG. 2 and provides yet another way to detect a conversation. The speaking effort detector 600 includes a formant detector 610, a speech detector 620, a formant trend extractor 630, a time-weighted speech level generator 640, a noise estimator 650, a speech history recorder 660, and a Lombard processing unit 670.

Formant detector 610 receives an audio signal 602A from a particular zone and is configured to identify formants 612 in the power spectrum of the audio signal 602A, and the frequencies of the formants 612. Each formant corresponds to a resonance in the vocal tract and represents a concentration of acoustic energy around a particular harmonic frequency. Because most consonants do not have harmonic frequency spectra, formants are typically associated with vowels. As described earlier, formants can be identified through linear predictive coding. Alternatively, formants can be detected by simply comparing all the peaks in the power spectrum of the audio signal to identify their relative spacing (e.g., in hertz). Formants may correspond to peaks where the ratio of the frequency spacing to the frequency spacing of other peaks is equal, or approximately equal, to an integer fraction ($3/4$, $5/6$, $2/3$, $6/7$, etc.). The frequencies at such peaks likely correspond to formants, whose energy is typically lower than that of background noise. Therefore, even though the main vowel formant may be buried in noise such that the main vowel formant cannot be reliably and directly detected using simpler types of time/frequency analysis, the main vowel formant can nevertheless be detected using the techniques described above.

Speech detector 620 determines whether any of the audio signals 602A, 602B, and 602N represents speech. Speech detector 620 can be implemented by the speech detector 400 in FIG. 4. In the embodiment of FIG. 6, the speech detector 620 outputs a signal 614 whose value indicates whether speech has been detected in any of the zones. The signal 614 may identify which zone or audio signal speech has been detected in.

For a given acoustic noise level, speech will contain vowel formant fundamentals within a min/max frequency range. This range will shift to relatively higher frequencies with an increase in the noise level. Formant trend extractor 630 tracks changes in the frequencies of the formants 612 over time. The formants 612 are updated by the formant detector 610, which may be configured to repeatedly estimate the frequencies of the formants based on changes in the audio signal 602A. The formant trend extractor 630 may be configured to generate, as a formant trend, a time-weighted average 616 of the formant frequencies. Tracking formants enables more robust conversation detection because the contributions of non-stationary noise sources (e.g., noise from the vehicle hitting a road bump, keys jingling, ringing of a phone, etc.) to the power spectrum are not represented by the formants.

FIG. 6 depicts formant detection and trend extraction for a single audio signal, but the same detection and trend extraction can be performed for each of the audio signals from the various zones. For instance, a separate speaking effort detector 600 may be provided for each of the audio signals 602A, 602B, and 602N.

Time-weighted speech level generator 640 generates a time-weighted average of the magnitudes of the power spectrum of an audio signal from a particular zone when the signal 614 indicates that speech was detected in that zone. The time-weighted average for a particular zone can be updated whenever speech is detected in that zone.

The time-weighted averages 616 and 618 represent a history of changes in the formant frequencies and spectral magnitude. This history can be input to the Lombard processing unit 670 to determine whether or not a talker (in the example of FIG. 8, the talker associated with audio signal 602A) is exerting greater than expected speaking effort. For example, formant frequencies and overall spectrum magnitude are expected to increase as a result of a talker exerting more effort to speak against background noise. Time-weighted averaging is one way to compute an average of a set of values over time. In some embodiments, other forms of weighted averaging, or a simple arithmetic mean, may be used to calculate inputs to the Lombard processing unit 670.

Noise estimator 650 is analogous to noise estimator 310 in FIG. 3 and receives, as input, the audio signals 602A, 602B, and 602N. The noise estimator generates a noise spectrum estimate signal 622 characterizing a noise level per unit spectrum of the environment. The noise spectrum estimate signal 622 is delivered to both the Speech history recorder 660 and the Lombard processing unit 670 for later updating the Lombard model 677.

Speech history recorder 660 may comprise a storage memory configured to store previously calculated time-weight averages 616 and 618 to provide the Lombard processing unit 670 with time-weighted averages 629 over a longer period of time. This enables the Lombard processing unit 670 to take into consideration the most recent changes in formant frequency and spectral magnitude (provided via the current outputs of the formant trend extractor 630 and the time-weighted speech level generator 640), as well as earlier changes.

Lombard processing unit 670 is configured to process the time-weighted averages 616, 618, and 629 plus the noise spectrum estimate signal 622 to determine whether the Lombard effect is present in the audio signal 602A. The Lombard processing unit 670 may apply a Lombard model 677 to predict the expected average formant frequency and the expected average spectral magnitude for the audio signal 602A at any given time, based on the level of noise indicated by the noise spectrum estimate signal 622. The Lombard model 677 may be generated based on information regarding formant frequencies and spectral magnitudes that are expected for a given level of noise. The expectations may be based on the time-weighted averages produced when there is low noise as a baseline. This informs the Lombard processing unit 670 what non-Lombard speech looks like for a particular talker in a particular zone. The Lombard model will be updated per zone based on the specific baseline and ratiometric relative changes in each of the metrics.

The Lombard processing unit 670 generates a result 680 indicating whether there exists a Lombard effect relative to the current level of noise in the environment, as indicated by the noise spectrum estimate signal 622. The result 680 can be a Boolean result where a value of one or true indicates that the Lombard effect is present and a value of zero or false indicates that the Lombard effect is not present. The Lombard processing unit 670 may set the result 680 to a value of one when the measured frequencies or spectral magnitudes represented by any of the time-weighted averages 616, 618, and 629 are greater than expected.

Based on the disclosure above, it should be apparent that various techniques based on spectral analysis can be utilized to detect speech and conversation in accordance with the present embodiments. Although the details of the processing vary, the techniques have certain aspects in common, such as detection of speech or conversation based on application of a threshold to values derived from spectral analysis of an audio signal, where the values derived from spectral analysis are dependent upon frequency components of the audio signal and changes in those frequency components over time.

Having described example devices and systems that can be used to implement certain embodiments, example processes that can be performed by the devices and systems will now be described in connection with FIGS. 9-11.

Figure 9:
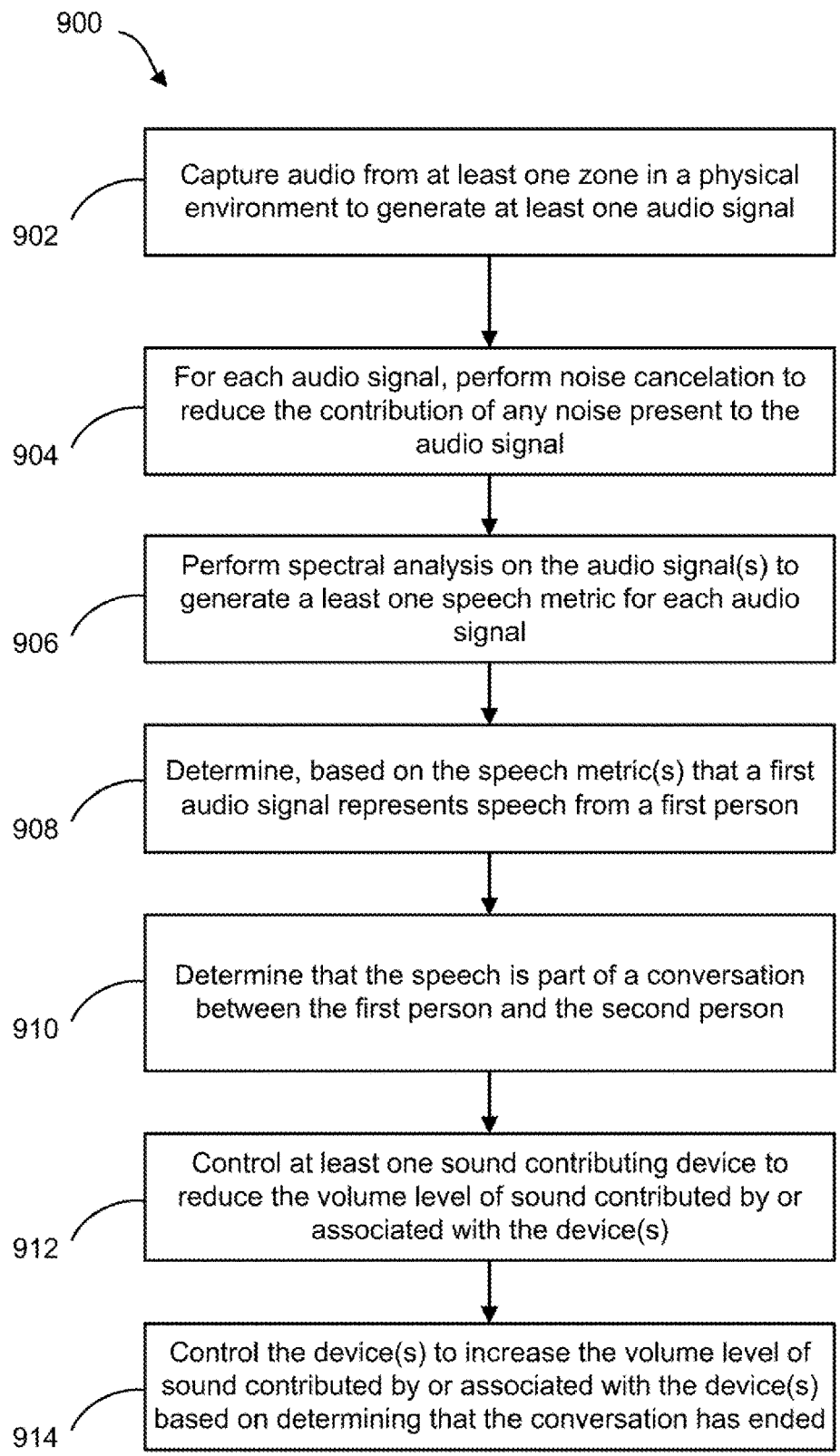
FIG. 9 is a flowchart illustrating a process for adjusting the volume level of noise in a physical environment according to certain embodiments.
Figure 10:
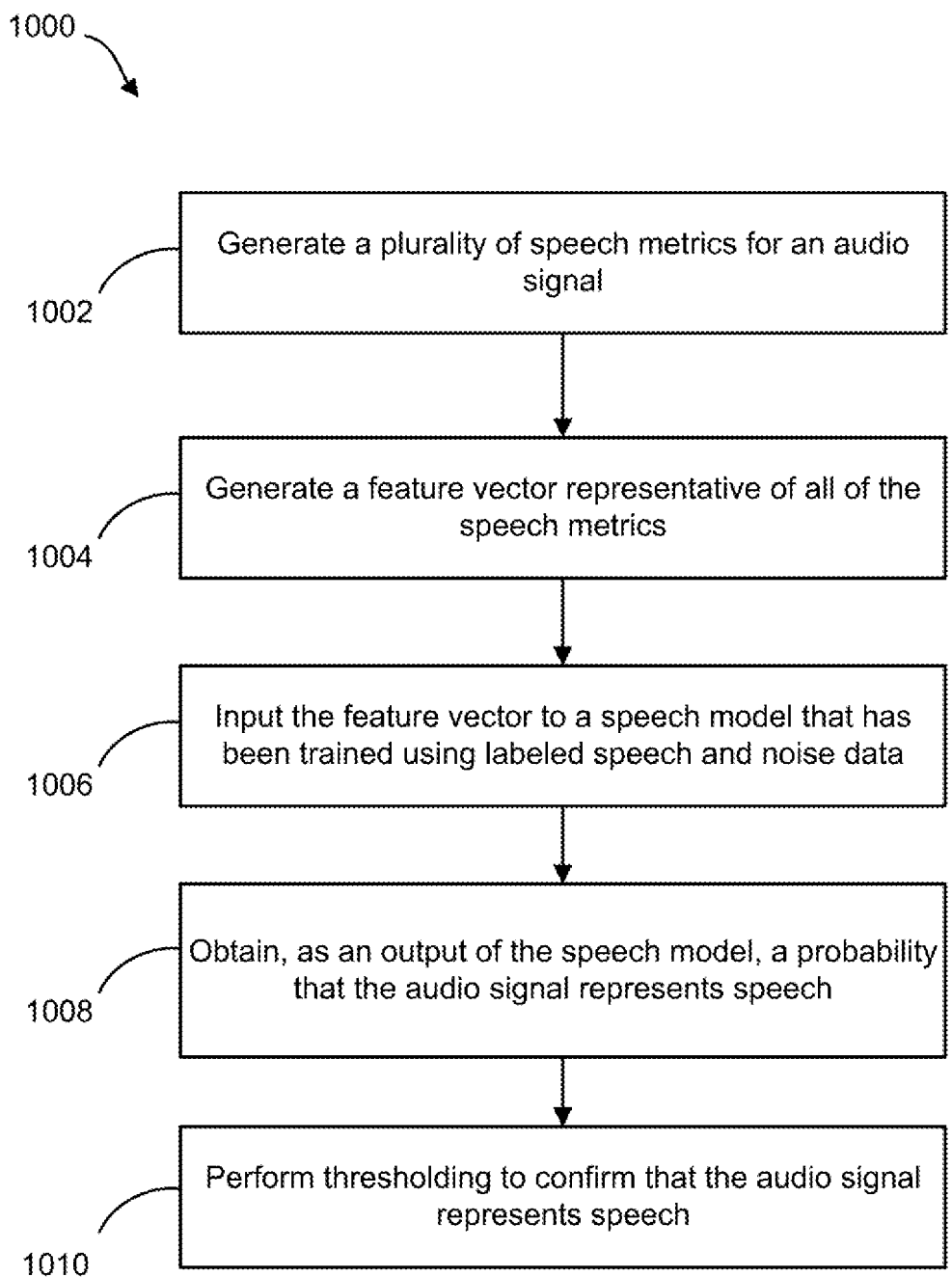
FIG. 10 is a flowchart illustrating a process for detecting speech according to certain embodiments.
Figure 11:
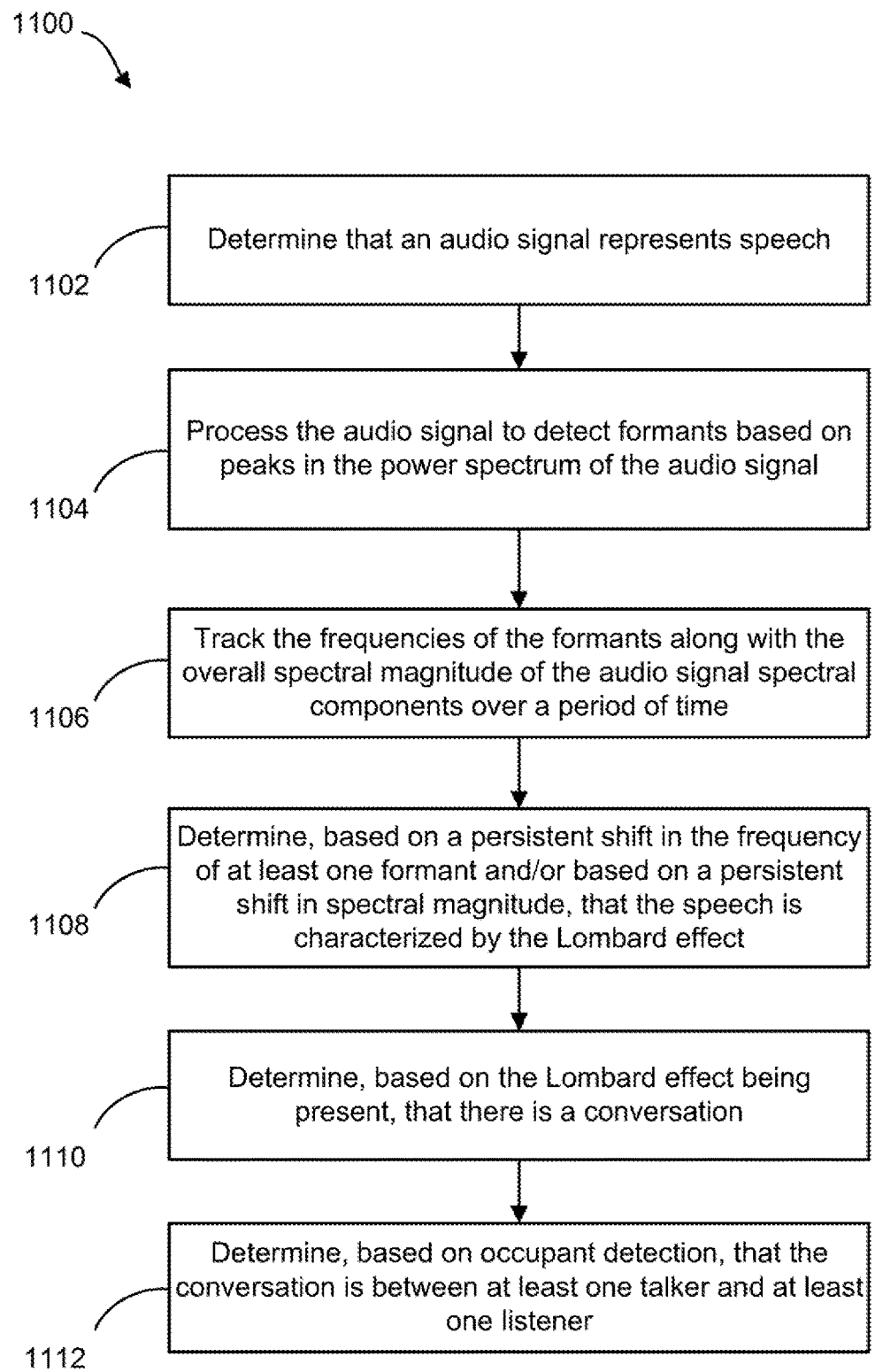
FIG. 11 is a flowchart illustrating a process for detecting a conversation according to certain embodiments.

The processing shown in FIGS. 9-11 may be implemented in software (e.g., program code) executed by one or more processing units (e.g., a vehicle control unit or a controller device in a home automation system) of the respective systems, hardware, or combinations thereof. The software may be stored on a non-transitory storage medium (e.g., on a memory device). FIGS. 9-11 depict various processing steps occurring in a particular sequence or order. However, in other embodiments, the steps may be performed in a different order, in parallel, or certain steps may be omitted. In certain embodiments, such as in the embodiment depicted in FIG. 2, the processing depicted in FIGS. 9-11 may be performed by one or more components in a vehicle system (e.g., the vehicle control system 230).

FIG. 9 is a flowchart illustrating a process 900 for adjusting volume level in a physical environment according to certain embodiments. The process 900 begins at 902 with audio being captured from at least one zone in a physical environment to generate at least one audio signal. For example, each microphone 210 in FIG. 2 may generate a separate audio signal for a particular zone in the vehicle.

At 904, noise cancelation is performed (e.g., by noise/echo/feedback canceler 270) for each audio signal to reduce the contribution of any noise present in the environment the audio signal. As described earlier, noise cancelation may involve cross-talk cancelation, feedback cancelation, and/or echo cancelation. The cancelation of the noise at 904 can be performed in conjunction with estimating the level of noise represented in the audio signal. The estimating of the noise can be performed by the noise/echo/feedback canceler 270 or by another component of the vehicle control system (e.g., the noise estimator 310 in FIG. 3).

At 906, spectral analysis is performed on the audio signal(s) generated at 902 to generate at least one speech metric for each audio signal. A speech metric comprises one or more values indicative of whether the audio signal for which the speech metric was generated represents human speech. In certain embodiments, multiple speech metrics of different types are generated for each audio signal, for example using the spectral analysis units of the speech detector 400 in FIG. 4. As described above, such speech metrics may include one or more of the following: indicators of spectral flatness, indicators of spectral variability, mel-frequency cepstrum coefficients, linear predictive coding coefficients, and signal-to-noise ratio values.

At 908, a determination is made, based on the speech metric(s) generated at 906, that a first audio signal represents speech from a first person. For example, the determination at 908 may involve speech detection based on applying a trained speech model to a feature vector comprising speech metrics, as depicted in FIG. 4.

At 910, a determination is made that the speech is part of a conversation between the first person and a second person. The second person is someone participating in the conversation as at least a listener, and possibly also as a talker. As described earlier, conversations can be detected in various ways. For instance, the Lombard effect may be detected based on further spectral analysis of the first audio signal. Alternatively, spectral analysis could be performed to detect speech in a second audio signal (e.g., speech from a second person participating in the conversation with the first person). Further, occupant detection may be performed as part of the determination in 910.

At 912, at least one sound contributing device is controlled to reduce the volume level of sound contributed or associated with the device(s), and thus the noise level in the environment, e.g., noise in the vicinity of the at least one talker and/or the at least one listener whose conversation was detected at 910. For example, the vehicle control system 230 may include a volume controller, such as the volume controller 340 in FIG. 3, that adjusts the operating state of a sound contributing device to reduce the volume of sound contributed by the sound contributing device. In some embodiments, the sound contributing device is controlled to reduce the level of unwanted and/or distracting sound contributed by the device.

The processing in 902-912 can be repeated to, as mentioned earlier, incrementally adjust the same sound contributing device or to adjust a plurality of sound contributing devices in sequence. For example, in response to determining that the speaking effort of the first person has not decreased to a target speaking effort level after the operating state of the sound contributing device has been adjusted, the vehicle control system 230 may further reduce the volume level of sound contributed by the same sound contributing device by readjusting the operating state of the device (e.g., to open or close the same window in increments) and/or adjust an operating state of a second sound contributing device such that a volume level of sound contributed by the second device is reduced. In this manner, the noise level in the environment can be reduced over time.

In certain embodiments, the sound contributing device that is controlled in 910 is selected based on identification of which noise sources are present. The identification of the noise sources can be based on spectral analysis of audio signals to detect spectral characteristics associated with a particular noise source (e.g., frequencies associated with road noise) and/or based on knowledge of the operating status of a sound contributing device (e.g., whether the HVAC system is set to a cooling mode). Thus, the sound contributing device can be selected to specifically target an identified noise source for volume reduction.

At 914, the at least one sound contributing device that was controlled in 912 is controlled to increase the volume level of sound contributed by or associated with the device(s). The controlling in 914 is based on determining that the conversation has ended. To determine the end of the conversation, the processing in 902-906 can be repeated to detect, for example, an absence of speech from at least one person and/or simultaneous speech from both people.

FIG. 10 is a flowchart illustrating a process 1000 for detecting speech according to certain embodiments. The process 1000 can be performed by a speech detector such as the speech detector 400 in FIG. 4. Process 1000 can be used to implement the processing in 906 and 908 of FIG. 9.

At 1002, a plurality of speech metrics are generated for an audio signal. For example, as described earlier in connection with FIG. 4, the speech detector may include a plurality of spectral analysis units, each of which is configured to generate a different type of speech metric based on analysis of how the frequency components of the audio signal change over a period of time.

At 1004, a feature vector that is representative of all the speech metrics from 1002 is generated (e.g., by feature vector generator 430). The feature vector may, for example, be a multi-dimensional vector of features, where the value of each feature corresponds to a value of one of the speech metrics.

At 1006, the feature vector is input to a speech model (e.g., the GMM 442) that has been trained, using labeled speech and noise data, to classify newly observed data (e.g., data that has not been labeled as speech or noise, such as the feature vector generated at 1004) as being either speech or noise. The speech model can be executed by a processing unit (e.g., processing unit 440) of the speech detector. A GMM inside a Lombard detector may be used in a similar way (e.g., as part of the processing in 1102 of FIG. 11, discussed below), the GMM being previously trained by speech/noise signals labeled as Lombard speech and non-Lombard speech.

At 1008, a probability that the audio signal represents speech is obtained as an output of the speech model. The classification of the feature vector in 1006 may, for example, involve calculating both the probability that the audio signal represents speech and the probability that the audio signal represents noise. If the probability of speech is greater than the probability of noise, the speech model may output the probability of speech to indicate that the audio signal has been classified as speech, and the value of the probability represents the degree of confidence in the classification.

At 1010, thresholding is performed to confirm that the audio signal represents speech. For example, as described earlier, the processing unit 440 may perform log-likelihood thresholding. The thresholding in 1010 operates as a check to avoid false positive speech detection.

FIG. 11 is a flowchart illustrating a process 1100 for detecting a conversation according to certain embodiments. The process 1100 can be performed by a conversation detector that implements Lombard effect detection, for example, using the speaking effort detector 600 in FIG. 6. Process 1100 can be used to implement the processing in 910 of FIG. 9.

At 1102, a determination is made that an audio signal represents speech. The determination in 1102 can be based on any of the speech detection methods described earlier. In some embodiments, the determination in 1102 involves the processing depicted in FIG. 10.

At 1104, the audio signal is processed to detect formants based on peaks in the power spectrum of the audio signal. As described earlier, formants can be detected through linear predictive coding or based on the spacing of the peaks in the frequency domain.

At 1106, the frequencies of the formants (e.g., the peak frequency of each formant) are tracked, along with the overall spectral magnitude of the audio signal spectral components, over a period of time. The duration of the period of time can vary, but several seconds is generally sufficient for high confidence in conversation detection. The tracking may involve observing how the frequencies of the formants change from one instant to the next (e.g., frame by frame) over the course of the time period. Additionally, the tracking may involve observing how the amplitudes of the frequencies change from one instant to the next. As described earlier in connection with the embodiment of FIG. 6, such tracking can be based on time-weighted averages.

At 1108, it is determined, based on a persistent shift in the frequency of at least one formant and/or based on a persistent shift in spectral magnitude, that the speech is characterized by the Lombard effect. When the Lombard effect is present, there is typically a shift in the frequencies of multiple formants. More specifically, the frequencies of the formants (and associated integer spaced harmonics) are expected to collectively increase. However, a shift in the frequency of a single formant may be sufficient to indicate that the Lombard effect is present. Thus, the determination in 1108 may involve detecting, based on the tracking in 1106, a greater than expected increase in one or more frequencies of the formants. Further, the Lombard effect can also manifest as an increase in overall spectral magnitude due to an increase in the volume level of speech.

At 1110, it is determined, based on the Lombard effect being present (as determined in 1108), that there is a conversation. In certain embodiments, the presence of the Lombard effect is a sufficient condition for determining that there is a conversation. For example, once speech has been detected in the audio signal from 1102 and the Lombard effect has been detected in the same audio signal, it may be inferred that there is a talker attempting to have a conversation with another person even if the speech of the other person has not been detected. Additional audio signals may of course be analyzed as part of determining that there is a conversation, for instance, to confirm that there is speech from the other person and that the timing of the speech from both people corresponds to a conversation, as discussed earlier in connection with the embodiment of FIG. 8.

At 1112, it is determined, based on occupant detection, that the conversation detected in 1110 is between at least one talker and at least one listener. As described earlier, the existence of another person in a different zone, the body posture of such a person, and/or other information about the status of one or more people in the environment can indicate whether there is a conversation. For example, the existence of the conversation could be confirmed based on detection of the presence of at least one other person in the environment besides the person whose speech is represented by the audio signal in 1102. As another example, the existence of the conversation could be confirmed based on determining that another person is leaning toward the person whose speech is represented by the audio signal in 1102.

Figure 12:
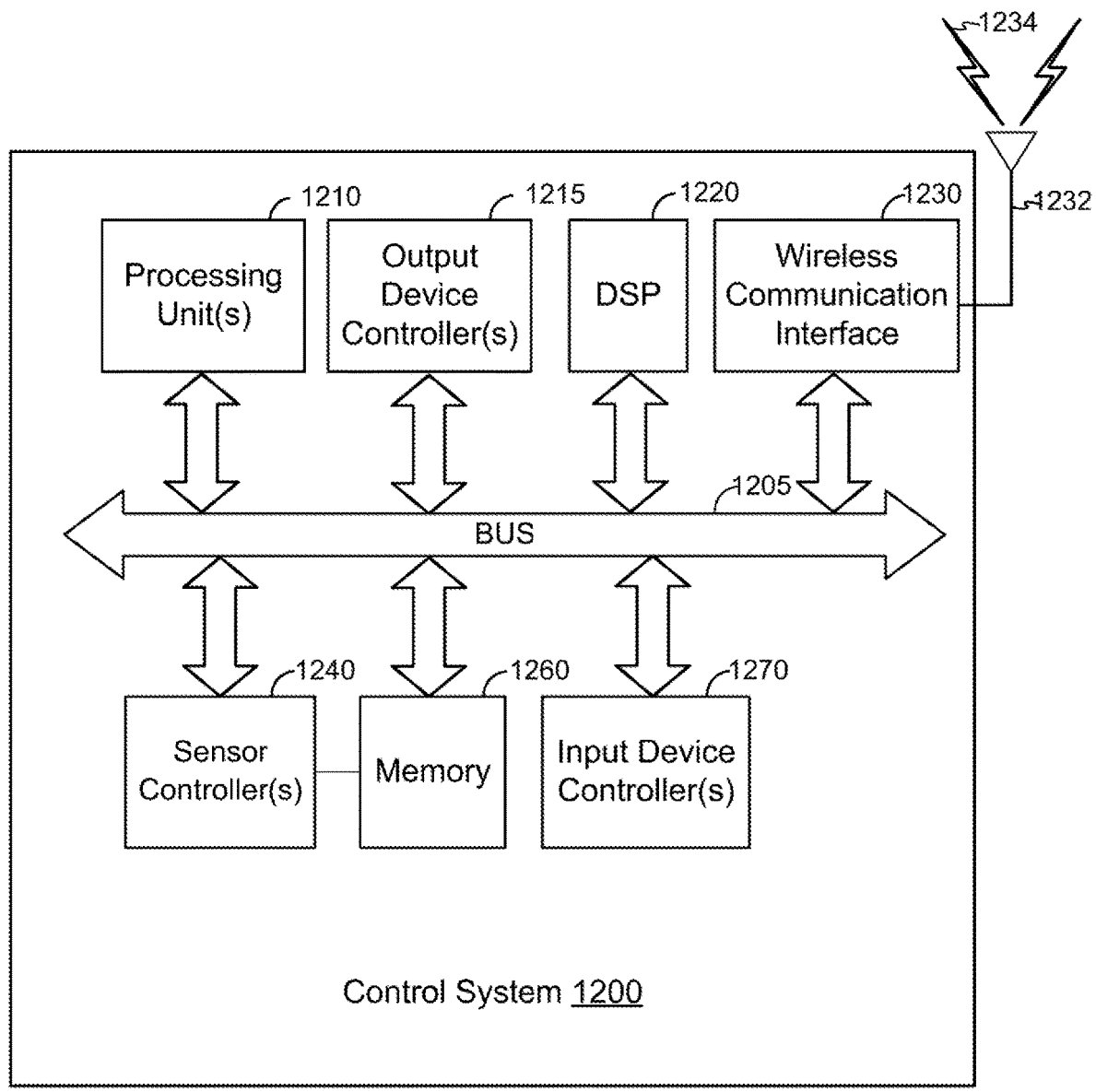
FIG. 12 is a simplified block diagram of a control system usable for implementing one or more embodiments.

FIG. 12 is a simplified block diagram of a control system 1200 usable for implementing one or more embodiments of the present disclosure. For instance, the control system 1200 may represent an implementation of the vehicle control system 230 in FIG. 2. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations.

The control system 1200 is shown comprising hardware elements that can be electrically coupled via a bus 1205 such as a CAN bus (or may otherwise be in communication, as appropriate). The hardware elements may include a processing unit(s) 1210 which can include without limitation one or more general-purpose processors, one or more special-purpose processors (such as digital signal processing (DSP) chips, graphics acceleration processors, application specific integrated circuits (ASICs), and/or the like), and/or other processing structure or means. Some embodiments may have a separate DSP 1220, depending on desired functionality. The control system 1200 also can include one or more input device controllers 1270, which can control without limitation an in-vehicle touch screen, a touch pad, microphone, button(s), dial(s), switch(es), and/or the like; and one or more output device controllers 1215, which can control without limitation a display, light emitting diode (LED), loudspeakers, and/or the like. Output device controllers 1215 may, in some embodiments, include controllers that individually control various sound contributing devices in the vehicle.

The control system 1200 may also include a wireless communication interface 1230, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication interface 1230 may permit data to be exchanged with a network, wireless access points, other computer systems, and/or any other electronic devices described herein. The communication can be carried out via one or more wireless communication antenna(s) 1232 that send and/or receive wireless signals 1234. In certain embodiments, the wireless communication interface 1230 may transmit information for remote processing of audio signals and/or receiving information used for local processing of audio signals. For instance, the GMM 442 or the threshold information 444 in FIG. 4 may be determined through offline processing performed on a remote computer system and transmitted for storage in/programmed into the vehicle, e.g., storage in a memory accessible to the speech detector 400.

The control system 1200 can further include sensor controller(s) 1240. Such controllers can control, without limitation, one or more microphones, one or more accelerometer(s), gyroscope(s), camera(s), RADAR sensor(s), LIDAR sensor(s), ultrasonic sensor(s), magnetometer(s), altimeter(s), microphone(s), proximity sensor(s), light sensor(s), and the like.

The control system 1200 may further include and/or be in communication with a memory 1260. The memory 1260 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the control system 1200 can also comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods. The memory 1260 may further comprise storage for data used by the software elements. For instance, memory 1260 may store samples of audio signals, one or more speech models (e.g., GMM 442), threshold information (e.g., threshold values for detecting speech or conversation), and/or various metrics and other information derived from processing of audio signals.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments. Also, a number of steps may be undertaken before, during, or after the above elements are considered. Accordingly, the above description does not limit the scope of the disclosure to the exact embodiments described.

What is claimed is:

1. A method for reducing noise in a physical environment, comprising:
    receiving, by a control system, a first audio signal corresponding to sound captured by a first microphone located in the physical environment;
    generating, by a processing unit of the control system and based on spectral analysis of the first audio signal, at least one speech metric, wherein the spectral analysis comprises analysis of changes in frequency components of the first audio signal over a period of time, and wherein the at least one speech metric comprises a value indicative of whether the first audio signal represents human speech;
    determining, by the control system and based on the at least one speech metric, that the first audio signal represents speech from a first person;
    determining, by the control system, that the speech is part of a conversation between the first person and a second person, wherein the second person participates in the conversation as at least a listener and is located in the physical environment or located remotely, and wherein determining that the speech is part of the conversation between the first person and the second person comprises:
        (i) generating, based on the first audio signal and a second audio signal representing speech from the second person, a conversation metric representing a degree of certainty that the first person and the second person are speaking to each other, wherein a value of the conversation metric changes over time to indicate an increasing degree of certainty as a number of instances in which the first person and the second person take turns speaking increases and/or as a duration between the first person speaking and the second person speaking decreases; or
        (ii) determining, based on further spectral analysis of the first audio signal, that the first person is exerting greater than expected speaking effort relative to a current level of the noise in the physical environment, wherein the noise in the physical environment includes sound contributed by or associated with one or more devices in the physical environment, and wherein the determining that the first person is exerting greater than expected speaking effort comprises applying a threshold to a result of the further spectral analysis, the threshold being a relative threshold that depends on the current level of the noise in the physical environment; and
    adjusting, by the control system and in response to the determining that the speech is part of the conversation between the first person and the second person, an operating state of a first device in the physical environment, wherein the adjusting of the operating state of the first device reduces a volume level of sound contributed by or associated with the first device.

2. The method of claim 1, wherein the determining that the first person is exerting greater than expected speaking effort comprises determining, through applying the threshold to the result of the further spectral analysis, that a Lombard effect is present in the first audio signal.

3. The method of claim 2, wherein the determining that the Lombard effect is present in the first audio signal comprises:
    identifying frequencies of formants in a power spectrum of the first audio signal;
    tracking changes in the frequencies of the formants over time; and
    detecting, based on the tracking, a greater than expected increase in one or more of the frequencies of the formants.

4. The method of claim 2, further comprising:
    determining, by the control system, whether the speaking effort of the first person decreases after the operating state of the first device has been adjusted; and
    responsive to determining that the speaking effort of the first person has not decreased to a target speaking effort level after the operating state of the first device has been adjusted:
        further reducing the volume level of the sound contributed by or associated with the first device by readjusting the operating state of the first device, or
        adjusting an operating state of a second device in the physical environment such that a volume level of sound contributed by or associated with the second device is reduced.

5. The method of claim 1, wherein the determining that the speech is part of the conversation between the first person and the second person involves generating the conversation metric, and wherein the second audio signal corresponds to sound captured by a second microphone in a different location in the physical environment than the first microphone.

6. The method of claim 5, wherein the determining that the speech is part of the conversation between the first person and the second person further comprises:
    determining that the conversation metric exceeds a threshold associated with conversation between two speakers.

7. The method of claim 1, wherein the determining that the speech is part of the conversation between the first person and the second person further comprises:
   determining, using one or more sensors in the physical environment that the second person is facing the first person or leaning toward the first person.

8. The method of claim 1, wherein the generating of the at least one speech metric comprises generating a plurality of speech metrics based on different types of spectral analysis, and wherein the determining that the first audio signal represents speech from the first person comprises:
   forming a feature vector using the plurality of speech metrics; and
   inputting the feature vector into a speech model that has been trained on labeled speech data and labeled noise data, wherein the speech model is configured to classify the feature vector as corresponding to one of speech or noise.

9. The method of claim 1, wherein the adjusting of the operating state of the first device comprises:
   determining, based on the operating state of the first device, an extent to which noise corresponding to the sound contributed by or associated with the first device can be reduced as a result of changing the operating state of the first device; and
   determining, based on an operating state of a second device in the physical environment, an extent to which noise corresponding to sound contributed by or associated with the second device can be reduced as a result of changing the operating state of the second device;
   wherein the adjusting of the operating state of the first device is performed in response to determining that the extent to which noise corresponding to the sound contributed by or associated with the first device can be reduced is greater than the extent to which noise corresponding to the sound contributed by or associated with the second device can be reduced.

10. The method of claim 1, wherein the spectral analysis of the first audio signal comprises determining one or more of: a spectral variability of the first audio signal, a spectral flatness of the first audio signal, a mel-frequency cepstrum coefficient, or a signal-to-noise ratio of the first audio signal.

11. The method of claim 1, wherein the physical environment is a vehicle environment, and wherein the first device is one of an electric window, a heating, ventilation, and air conditioning (HVAC) system, or a loudspeaker playback system with a volume control apparatus.

12. A control system for reducing noise in a physical environment, comprising:
   a speech detector configured to:
      receive a first audio signal corresponding to sound captured by a first microphone located in the physical environment;
      generate, based on spectral analysis of the first audio signal, at least one speech metric, wherein the spectral analysis comprises analysis of changes in frequency components of the first audio signal over a period of time, and wherein the at least one speech metric comprises a value indicative of whether the first audio signal represents human speech; and
      determine, based on the at least one speech metric, that the first audio signal represents speech from a first person;
   a conversation detector configured to determine that the speech is part of a conversation between the first person and a second person, wherein the second person participates in the conversation as at least a listener and is located in the physical environment or located remotely, and wherein to determine that the speech is part of the conversation between the first person and a second person, the conversation detector is configured to:
      (i) generate, based on the first audio signal and a second audio signal representing speech from the second person, a conversation metric representing a degree of certainty that the first person and the second person are speaking to each other, wherein a value of the conversation metric changes over time to indicate an increasing degree of certainty as a number of instances in which the first person and the second person take turns speaking increases and/or as a duration between the first person speaking and the second person speaking decreases; or
      (ii) determine, based on further spectral analysis of the first audio signal, that the first person is exerting greater than expected speaking effort relative to a current level of the noise in the physical environment, wherein the noise in the physical environment includes sound contributed by or associated with one or more devices in the physical environment, and wherein to determine that the first person is exerting greater than expected speaking effort, the conversation detector is configured to apply a threshold to a result of the further spectral analysis, the threshold being a relative threshold that depends on the current level of the noise in the physical environment; and
   a volume controller configured to, in response to the conversation detector determining that the speech is part of the conversation between the first person and the second person, adjust an operating state of a first device in the physical environment, wherein the adjusting of the operating state of the first device reduces a volume level of sound contributed or associated with the first device.

13. The control system of claim 12, wherein the control system further comprises a speaking effort detector configured to determine whether the speaking effort of the first person decreases after the operating state of the first device has been adjusted, and wherein the volume controller is configured to, in response to the speaking effort detector determining that the speaking effort of the first person has not decreased to a target speaking effort level after the operating state of the first device has been adjusted:
   further reduce the volume level of sound contributed by or associated with the first device by readjusting the operating state of the first device, or
   adjust an operating state of a second device in the physical environment such that a volume level of sound contributed by or associated with the second device is reduced.

14. The control system of claim 12, wherein to determine that the speech is part of the conversation between the first person and the second person, the conversation detector generates the conversation metric, and wherein the second audio signal corresponds to sound captured by a second microphone in a different location in the physical environment than the first microphone.

15. The control system of claim 12, wherein to determine that the speech is part of the conversation between the first person and the second person, the conversation detector determines, using one or more sensors in the physical environment, that the second person is facing the first person or leaning toward the first person.

16. The control system of claim 12, wherein the speech detector is configured to generate a plurality of speech metrics based on different types of spectral analysis, and wherein to determine that the first audio signal represents speech from the first person, the speech detector:
- forms a feature vector using the plurality of speech metrics; and
- inputs the feature vector into a speech model that has been trained on labeled speech data and labeled noise data, wherein the speech model is configured to classify the feature vector as corresponding to one of speech or noise.

17. The control system of claim 12, wherein the physical environment is a vehicle environment, and wherein the first device is one of an electric window, a heating, ventilation, and air conditioning (HVAC) system, or a loudspeaker playback system with a volume control apparatus.

18. A non-transitory computer-readable storage medium containing instructions that, when executed by one or more processors of a computer, cause the one or more processors to:
- receive a first audio signal corresponding to sound captured by a first microphone located in a physical environment;
- generate, based on spectral analysis of the first audio signal, at least one speech metric, wherein the spectral analysis comprises analysis of changes in frequency components of the first audio signal over a period of time, and wherein the at least one speech metric comprises a value indicative of whether the first audio signal represents human speech;
- determine, based on the at least one speech metric, that the first audio signal represents speech from a first person;
- determine that the speech is part of a conversation between the first person and a second person, wherein the second person participates in the conversation as at least a listener and is located in the physical environment or located remotely, and wherein to determine that the speech is part of the conversation between the first person and the second person, the instructions cause the one or more processors to:
  (i) generate, based on the first audio signal and a second audio signal representing speech from the second person, a conversation metric representing a degree of certainty that the first person and the second person are speaking to each other, wherein a value of the conversation metric changes over time to indicate an increasing degree of certainty as a number of instances in which the first person and the second person take turns speaking increases and/or as a duration between the first person speaking and the second person speaking decreases; or
  (ii) determine, based on further spectral analysis of the first audio signal, that the first person is exerting greater than expected speaking effort relative to a current level of noise in the physical environment, wherein the noise in the physical environment includes sound contributed by or associated with one or more devices in the physical environment, and wherein determining that the first person is exerting greater than expected speaking effort comprises applying a threshold to a result of the further spectral analysis, the threshold being a relative threshold that depends on the current level of the noise in the physical environment; and
- adjust, in response to determining that the speech is part of the conversation between the first person and the second person, an operating state of a device in the physical environment, wherein the adjusting of the operating state of the device reduces a volume level of sound contributed by or associated with the device, and wherein the sound contributed by or associated with the device corresponds to noise in the physical environment.

* * * * *